United States Patent
Wang et al.

(10) Patent No.: US 10,129,800 B2
(45) Date of Patent: Nov. 13, 2018

(54) METHODS AND EQUIPMENT FOR MANAGEMENT OF PLAYBACK BUFFERS

(71) Applicant: TELEFONAKTIEBOLAGET LM ERICSSON (PUBL), Stockholm (SE)

(72) Inventors: Min Wang, Luleå (SE); Hans Hannu, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 85 days.

(21) Appl. No.: 15/128,670

(22) PCT Filed: Mar. 26, 2014

(86) PCT No.: PCT/SE2014/050365
§ 371 (c)(1),
(2) Date: Sep. 23, 2016

(87) PCT Pub. No.: WO2015/147710
PCT Pub. Date: Oct. 1, 2015

(65) Prior Publication Data
US 2017/0127321 A1    May 4, 2017

(51) Int. Cl.
*H04W 36/02* (2009.01)
*H04W 28/14* (2009.01)
(Continued)

(52) U.S. Cl.
CPC ........ *H04W 36/023* (2013.01); *H04L 47/29* (2013.01); *H04L 65/1069* (2013.01);
(Continued)

(58) Field of Classification Search
CPC ...... H04L 47/29; H04W 28/02; H04W 36/02; H04W 36/023; H04W 36/0083; H04W 28/14
See application file for complete search history.

(56) References Cited

U.S. PATENT DOCUMENTS 8,228,861 B1 * 7/2012 Nix ................. H04W 36/00 370/329
2006/0045139 A1 3/2006 Black et al.
(Continued)

FOREIGN PATENT DOCUMENTS

WO 2012/130298 A1 10/2012
WO 2013055999 A1 4/2013

OTHER PUBLICATIONS

Bellavista, Paolo et al., "Adaptive Buffering-based on Handoff Prediction for Wireless Internet Continuous Services," in Adaptive Buffering-Based on Handoff Prediction for Wireless Internet Continuous Services, 2005, 12 pages.
(Continued)

*Primary Examiner* — Benjamin H Elliott, IV
(74) *Attorney, Agent, or Firm* — Rothwell, Figg, Ernst & Manbeck, p.c.

(57) ABSTRACT

There is provided methods that enables a User Equipment to adjust a playback buffer in the case of a potential handover to thereby mitigate problems with buffer underrun and freezing of playback of media content. There is also provided a User Equipment and a Network Controller configured to perform the steps of the methods as well as a computer program.

29 Claims, 17 Drawing Sheets

(51) Int. Cl.
*H04W 28/02* (2009.01)
*H04L 12/801* (2013.01)
*H04W 36/00* (2009.01)
*H04L 29/06* (2006.01)

(52) U.S. Cl.
CPC .......... *H04L 65/4084* (2013.01); *H04L 65/80* (2013.01); *H04W 28/0226* (2013.01); *H04W 28/14* (2013.01); *H04W 36/0083* (2013.01); *H04L 65/1083* (2013.01)

(56) References Cited

U.S. PATENT DOCUMENTS

| | | | |
|---|---|---|---|
| 2006/0077994 A1 | 4/2006 | Spindola et al. | |
| 2006/0088000 A1* | 4/2006 | Hannu | H04L 49/90 370/328 |
| 2007/0207804 A1* | 9/2007 | Sharma | H04L 29/06027 455/436 |
| 2012/0320814 A1* | 12/2012 | Chen | H04W 36/023 370/312 |
| 2013/0170471 A1* | 7/2013 | Nix | H04W 36/00 370/331 |
| 2013/0182643 A1* | 7/2013 | Pazos | H04L 65/4076 370/328 |
| 2013/0227122 A1* | 8/2013 | Gao | H04L 65/1083 709/224 |
| 2013/0279474 A1* | 10/2013 | Dimou | H04W 36/16 370/331 |
| 2013/0287006 A1* | 10/2013 | Nix | H04L 29/125 370/331 |
| 2013/0346588 A1* | 12/2013 | Zhang | H04L 43/08 709/224 |
| 2014/0153392 A1* | 6/2014 | Gell | H04W 28/0236 370/230 |
| 2014/0156863 A1* | 6/2014 | Gao | H04L 65/4084 709/231 |
| 2014/0245359 A1* | 8/2014 | De Foy | H04W 36/0011 725/62 |
| 2016/0241896 A1* | 8/2016 | Phillips | H04N 21/238 |
| 2016/0345219 A1* | 11/2016 | Brisebois | H04W 36/023 |
| 2017/0127321 A1* | 5/2017 | Wang | H04W 36/023 |

OTHER PUBLICATIONS

3GPP TS 36.331 V12.0.0, 3rd Generation Partnership Project; Technical Specification Group Radio Access Network; Evolved Universal Terrestrial Radio Access (E-UTRA); Radio Resource Control (RRC); Protocol specification (Release 12), Dec. 2013, 349 pages.

Chow, Lawrence et al., "Channel Aware Rebuffering for Wireless Media Streaming with Handoff Control," Globecome 2013—Wireless Networking Symposium, IEEE, ISBN: 978-1-4799-1353-4, pp. 4434-4439.

Chow, Lawrence, "Playout-Buffer Aware Hand-Off Control for Wireless Video Streaming," Globecom 2012—Wireless Networking Symposium IEEE, ISBN: 978-1-4673-0921-9, IEEE, 2012, pp. 5237-5241.

Zahran, Ahmed H. and Cormac J. Sreenan, "Threshold-Based Media Streaming Optimization for Heterogeneous Wireless Networks," IEEE Transactions on Mobile Computing, vol. 9. No. 6., Jun. 2010, pp. 753-764.

International Search Report and Written Opinion issued in International Application No. PCT/SE2014/050365, dated Dec. 10, 2014, 12 pages.

Supplementary European Search Report dated Mar. 14, 2017 issued in Application No. 14886887.0, 5 pages.

Gouche, S. et al.: "Remote management of DASH client populations", 107. MPEG Meeting, Jan. 2014, San Jose, USA, XP030060746, 4 pages.

Nokia, "Keeping PSK TLS in 3GPP Rel-6", 3GPP Draft, S3-050145, 3GPP TSG-SA WG3 Meeting #37, Sophia Antipolis, France, Feb. 21-25, 2005, 4 pages.

3GPP, 3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331, V12.1.0, (Mar. 2014), 356 pages.

* cited by examiner

METHODS AND EQUIPMENT FOR MANAGEMENT OF PLAYBACK BUFFERS

CROSS-REFERENCE TO RELATED APPLICATION(S)

This application is a 35 U.S.C. § 371 National Phase Entry Application from PCT/SE2014/050365, filed Mar. 26, 2014, designating the United States, the disclosure of which is incorporated by reference.

TECHNICAL FIELD

The proposed technology generally relates to a method for management of playback buffers in a User Equipment, UE. It also relates to a method for enabling adjustments of a playback buffer in a User Equipment, UE. The proposed technology also relates to a User Equipment, UE, configured to manage a playback buffer and a Network Controller configured to enable adjustments of a playback buffer in a UE. It further relates to a computer program and a carrier of the computer program.

BACKGROUND

Streaming media content such as music and video over mobile networks is increasing and more providers of such content are appearing on the market. Dynamic Adaptive Streaming over HTTP, DASH, is one standardized solution for providing rate adaptive video streaming. The client based rate adaptation in DASH is typically based on the throughput during download. If the recent download throughputs are high, the media client, such as a video client, requests next segments with higher bit rate. In other cases the client will request next segments with lower bit rate. Rate adaptation can be assisted by the network with improved performance as the network has better view of the current resource situation. Analysis by the inventors have shown that network assisted rate adaptation can achieve better capacity than purely client based rate adaptation.

In order to smooth the DASH downloading, the DASH client employs a client video playback buffer to store the video segments. The client buffer is typically pre-configured with a limited client video playback buffer size. The buffer may have a minimum (or lower) level and a maximum (or upper) level respectively. The client requests typically media up to the maximum (or upper) level at startup. The downloaded media segments are stored in the buffer and video playback is started when the minimum level is reached. The segment is composed of multiple adjacent video frames in time period of seconds. The rate adaptation is executed at the segment level.

One problem that users might experience during media streaming such as video streaming is that the playback might freeze due to buffer underrun. One of the reasons behind this is a user plane interruption caused by handover. That is, when the user moves out of the coverage of one cell (the serving cell) and in to another cell (the target cell) she will experience a handover to the new cell. Prior to such a handover, and after the handover has been performed, the user data throughput may be smaller than the current playback rate of the streamed content, and hence the media buffer runs empty or being playback with low rate and quality.

In particular cases, such as in Long Term Evolution, LTE, networks, the UE experiences hard handover, which means that the UE disconnects from the serving cell and establish a new connection to the target cell when handover is triggered. A UE could experience noticeable interruptions of the connection during the handover.

One way to counter the problems with handover is to step down to a lower rate by rate adaptation. A bit rate reduction might however not be enough to cope with the interruption and reduced throughput caused by the handover if the handover interruption period is long. Moreover, the rate adaptation may be not fast enough and the bit rate reduction will therefore not be enough to compensate for the decreasing radio channel quality.

Furthermore, due to potential fast throughput degradation along with larger media segments, which cause a low rate adaptation frequency, the client rate adaptation may make a severe mistake in the selection of the video rate in its adaptation. Hence, one drawback with client adaption and buffer management in a mobile network with handover, or some other similar low rate periods, is that the video quality is likely to be low in handover areas due to the low video rate to cater for the throughput degradation.

Another drawback is that the size of the client buffer typically is pre-configured with a pre-set and limited UE media/video playback buffer size. The pending media downloaded to the client/UE buffer may not be enough to cover the possible interruption caused by the handover and the low throughput prior, during, and after handover. The length of this time period depends on the quality of user radio connection in the serving cell and the system load in the target cell. This particular problem might be countered by providing a larger pre-configured playback buffer. This will however cause another problem with data resource waste due to the user abandoning the media streaming before it has finished.

Some measures have been suggested to ameliorate problems associated with buffer underrun during handover, in [1] there is disclosed a scheme that increases the maximum size of a playback buffer of the client/User Equipment. In [2] there is disclosed a scheme where buffer is a client cache and which utilizes a corresponding network function to control and fill the client cache. This suggested scheme relies on the caching functionality and is used during situations with un-used capacity.

The proposed technology aims to provide a mechanism that at least mitigate some of the above mentioned drawbacks within the technical field.

SUMMARY

It is an object to provide a method that enables a UE to manage a playback buffer during a potential handover from one serving cell to another. Such a method provides a way for a UE to download a large amount of streaming data, such as video or music, prior to an upcoming handover.

It is another object to provide a UE that is configured to enable a large download of data such as video or music prior to a handover.

It is yet another object to provide a method that enables a UE to adjust its buffer level settings prior to a handover. Such a method provides a way for a UE to download a large amount of streaming data, such as video or music, prior to an upcoming handover.

It still another object to provide a network controller that can enable a UE to alter its buffer level settings prior to an upcoming handover.

Another object is to provide a method a method for adjusting a playback buffer in a User Equipment, UE.

Still another purpose is to provide a User Equipment, UE, configured to adjust a playback buffer.

Yet another object is to provide a computer program that can be executed to perform tasks that enable a UE to alter its buffer level settings prior to a handover.

According to a first aspect, there is provided a method for management of a playback buffer in a UE. The method comprises the steps of:
- obtaining information based on measurement of at least one metric providing a first indication of an upcoming handover of the UE
- increasing an upper buffer level setting and a lower buffer level setting of the playback buffer to corresponding specified values in response to the obtained information providing the first indication of an upcoming handover of the UE, to thereby dynamically adjust the buffer level settings of the UE to enable a larger data download prior to a potential handover According to a second aspect the proposed technology involves a User Equipment, UE, configured to manage a playback buffer. The UE is configured to
- obtain information, based on measurements of at least one metric, that provides a first indication of an upcoming handover of the UE and configured to
- increase an upper buffer level setting and a lower buffer level setting of the playback buffer to corresponding specified values in response to the obtained information providing the first indication of an upcoming handover of the UE.

A third aspect of the proposed technology provides a method for enabling adjustments of a playback buffer in a User Equipment, UE. The method comprises the steps of:
- obtaining information providing a first indication of an upcoming handover of a UE
- determining values specifying an increased upper buffer level setting and an increased lower buffer level setting of a playback buffer in response to the obtained information providing the first indication of an upcoming handover of the UE
- transmitting the determined values to the UE to enable the UE to implement the increased upper buffer level setting and the lower buffer level settings to provide a way to obtain a larger data download prior to a potential handover.

A fourth aspect of the proposed technology provides a network controller configured to enable adjustment of playback buffer in a User Equipment, UE. The network controller is configured to:
- obtain information providing a first indication of an upcoming handover of a UE
and configured to
- determine values specifying an increased upper buffer level setting and an increased lower buffer level setting of a playback buffer in response to the obtained information providing the first indication of an upcoming handover of the UE
and configured to
- transmit the determined values to the UE to thereby enable the UE to implement the increased upper buffer level setting and the lower buffer level settings to provide a way to obtain a larger data throughput prior to a potential handover.

According to a fifth aspect there is provided a method for adjusting a playback buffer in a User Equipment, UE. The method comprises the steps of:
- receiving values specifying an increased upper buffer level setting and an increased lower buffer level setting of a playback buffer;
- increasing the upper buffer level setting and the lower buffer level settings to the received values to provide a way to obtain a larger data download prior to a potential handover.

According to a sixth aspect there is provided a User Equipment, UE, configured to adjust a playback buffer. The UE is configured to:
- receive values specifying an increased upper buffer level setting and an increased lower buffer level setting of a playback buffer and configured to
- increase the upper buffer level setting and the lower buffer level setting to the received values to provide a way to obtain a larger data download prior to a potential handover A seventh aspect of the proposed technology provides a computer program comprising instructions, which when executed by at least one processor, cause the processor(s) to:
- read information, providing a first indication of an upcoming handover of a UE
- increase an upper buffer level setting and a lower buffer level setting of a pre-configured playback buffer to corresponding specific values in response to the obtained information providing the first indication of an upcoming handover of the UE.

An eight aspect of the proposed technology provides a User Equipment, UE, configured to manage a playback buffer. The UE comprises:
- a reading module for reading information giving a first indication of an upcoming handover; and
- a level setting module for increasing an upper buffer level setting and a lower buffer level setting of a pre-configured playback buffer to corresponding specified values in response to the obtained information providing the first indication of an upcoming handover.

A ninth aspect of the proposed technology provides a network controller configured to enable an adjustment of a playback buffer in a User Equipment, UE. The network controller comprises:
- a reading module for reading information giving a first indication of an upcoming handover of the UE, and
- a determining module for determining values specifying an increased upper buffer level setting and an increased lower buffer level setting of a playback buffer in response to the obtained information providing the first indication of an upcoming handover of the UE, and
- an output module for outputting the determined values for transfer to the UE to enable the UE to implement the increased upper buffer level setting and the lower buffer level settings to provide a way to obtain a larger data throughput prior to a potential handover.

Advantages of the proposed technology relates to the fact that the dynamically adjusted buffer level settings of a client media playback buffer acts to increase the amount of pending media in the buffer when a handover is expected. The buffer will thus already contain pending media during the critical state when the handover is about to be performed. This will allow the user to enjoy the media playback with higher quality during the expected handover. Other advantages with the proposed technology will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of the technical environment setting the stage for the proposed technology.

A User Equipment within a cellular network is normally served by a radio station(s) stationed in the cell where the UE is moving. By means of the air interface the UE will be provided with data from the radio station. This data might be media content such as video and music. The UE receive the data and downloads it to a playback buffer to enable streaming of the media content. A playback buffer is normally pre-configured and comprises an upper buffer level and a lower buffer level. These levels determine the amount of data that can be downloaded to the buffer. For example, an upper level buffer setting might be set at a specified time value that is representing the maximal amount of media that can be contained in the buffer. The lower buffer level setting instead constitutes a threshold for the amount of data used for streaming media content. The lower buffer level might also be seen as the level where new data is requested for download. That is, when a certain amount of media contained in the buffer has been played, corresponding roughly to the time difference between the upper buffer level and the lower buffer level, new data for download is requested. By having a lower buffer level as a trigger for this request one tries to avoid the situation that a request is made when the buffer has already been emptied. If the buffer has already been emptied before a new request for data is made there will be a discontinuity in the media streaming which might be annoying for a user.

When a UE is moving closer to the cell border, the radio connection between the UE and the serving cell will typically be degraded until a handover to a new serving cell is triggered. The UE might have several neighbor cells where some or all are showing increasing radio channel quality with respect to the serving cell. As has been described earlier, prior, during and after the handover the UE might experience a degrading media playback quality.

To overcome the problems with degrading media playback quality associated to a potential handover of a UE within a network the proposed technology aims to provide an adaptive buffer management scheme giving suitable playback levels to the UE streaming client depending on the network and radio connection situation the UE experience. In broad terms, the proposed technology provide ways to perform dynamic adaptations or adjustments of media playback buffer sizes. This provides for a mechanism for increasing the amount of pending streaming media and is based on early indications or warnings of an upcoming handover based on information obtained through measurements.

Figure 1:
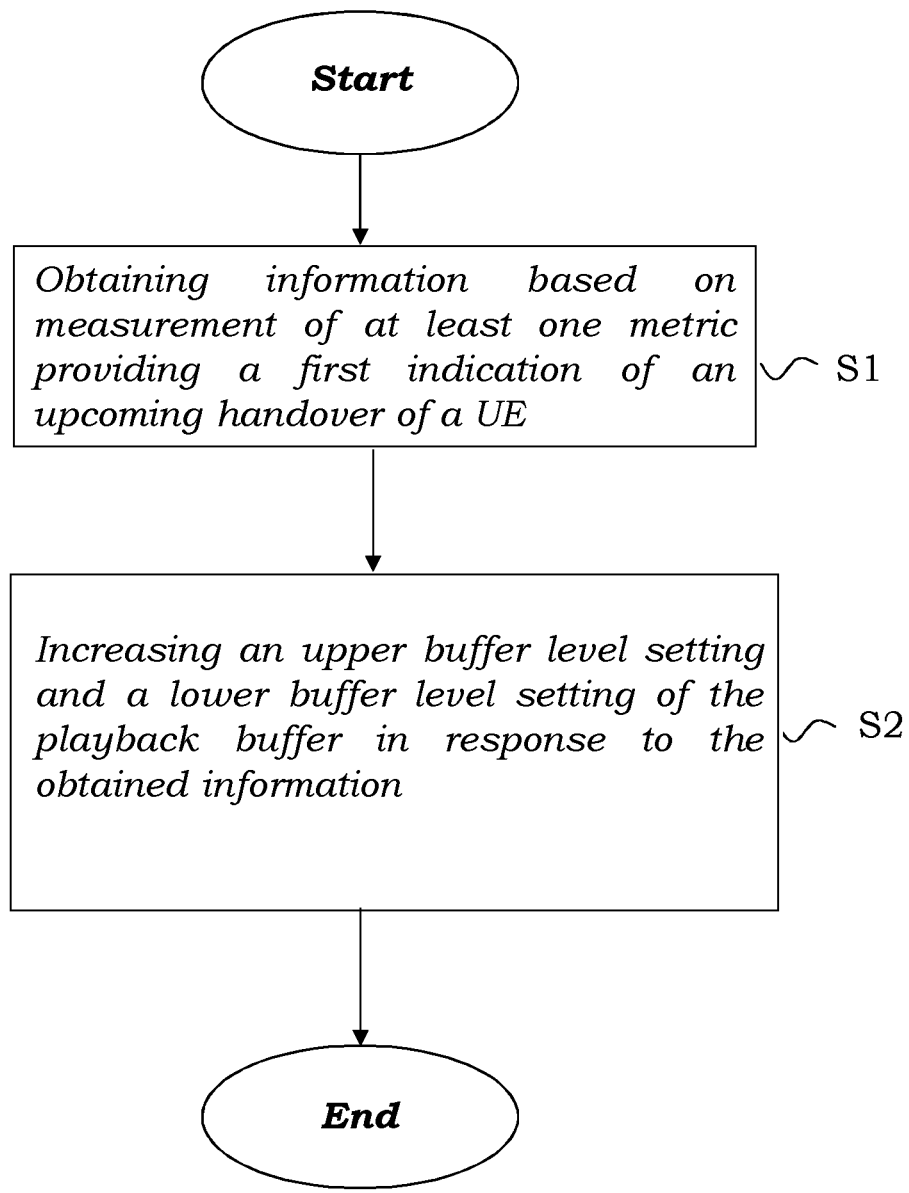
FIG. 1 is a flow diagram illustrating an embodiment of a method for management of a playback buffer in a UE according to the proposed technology.

A particular embodiment that provide this is disclosed schematically in the flow diagram of FIG. 1. That is, the proposed technology provides a method for management of a playback buffer in a UE. The method comprises the steps of:

obtaining S1 information based on measurement of at least one metric providing a first indication of an upcoming handover of the UE;

increasing S2 an upper buffer level setting and a lower buffer level setting of the playback buffer to corresponding specified values in response to the obtained information providing the first indication of an upcoming handover of the UE to thereby dynamically adjust the buffer level settings of the UE to enable a larger data download prior to a potential handover.

In other words, the method obtains, in a first step S1, an indication that a potential handover is upcoming. This indication might be obtained by measuring a metric that provides an indication whether a potential handover is probable in the near future. Based on this indication the method performs the step S2 of increasing the buffer level settings of the playback buffer to new values. That is, the playback buffer level settings of the initial configuration, which are set at a specified value, will be increased at the appropriate junction by performing the proposed method. This method will at least mitigate the drawbacks associated with playback buffer underrun and potential waste of data resource. It will also improve the streaming quality that the user experience during potential handover scenarios.

The above given method steps might be performed by the UE itself. Since a UE periodically measures entities such as radio quality and alike of both the serving cell and neighboring cells the UE might analyze the information comprised in these measurements to obtain, in step S1, a first indication that the UE might experience a handover in the near future. One particular metric or entity that might be measured and analyzed by the UE is the radio signal qualities of the serving cell. If the radio signal quality is below a given threshold, referred to as handover, HO, area hysteresis during a certain time span, referred to as handover, HO, area time, the UE obtains a first indication that it moves within a potential handover area where the UE will probably perform the serving cell change. Based on this indication the UE might increase S2 an upper buffer level setting and a lower buffer level setting of the playback buffer. By adjusting the buffer level settings when it is deemed that a handover is upcoming the method allows the UE to download a large amount of data to the buffer before the problems associated to the handover becomes severe.

There are a number of possible handover measurements that can be used to obtain S1 a first indication that a handover is potentially upcoming. Non-saturating examples include metrics such as Reference Signal Received Power, RSRP, Reference Signal Received Quality, RSRQ, (in LTE system), or Received Signal Code Power, RSCP, or Ec/Io (in UMTS network) or Channel Quality Indication, CQI, or path-loss or Received Signal Strength Indication, RSSI, in WiFi. If the network specifies the measurement entities that the UE shall perform these measurements can be used to obtain the first indication of a potential handover.

Figure 2:
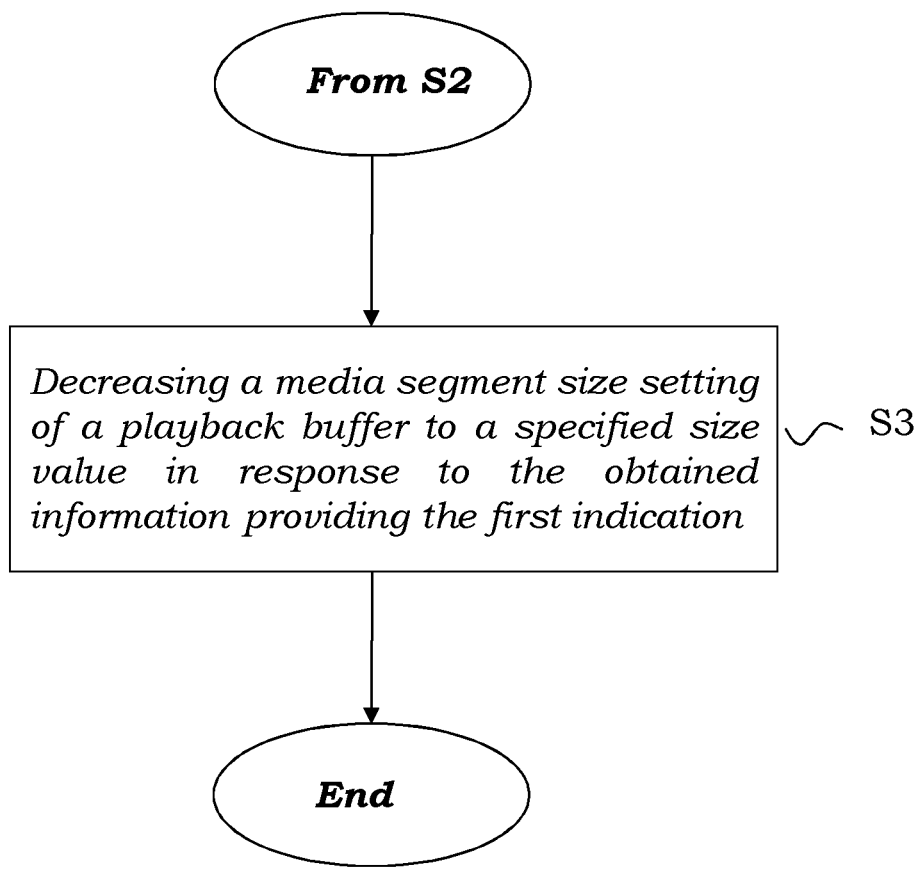
FIG. 2 is a flow diagram illustrating an exemplary embodiment of a method for management of a playback buffer in a UE according to the proposed technology.

In an exemplary embodiment of the proposed method, schematically disclosed in the flow diagram of FIG. 2 there is also provided a method for management of a playback buffer in a UE that comprises the further step of decreasing S3 a media segment size setting of a playback buffer to a specified size value in response to the obtained information providing the first indication of an upcoming handover of the UE to thereby reduce buffering of a large amount of low rate playback segments and/or reduce buffer underrun. Moreover this step also address the problem that longer media segments provides less opportunity to perform rate adaptation of the media download. So the step of decreasing the selected size of the media segment also increases the opportunities to perform rate adaptation.

So, by altering or adjusting the media segment size setting of the playback buffer in such a way that an initial or a pre-set size is decreased in a step S3 the UE will be constrained from downloading excessive amounts of media segments with poor quality in the time prior, during and directly after a handover. A particularly positive consequence of this is that the buffer is not full with low quality segments when the handover has been completed. The UE can therefore begin to download segments of higher quality as soon as the handover has been completed and there is a better radio connection between the UE and the serving cell. Since the size of the media segments has been decreased, the operation of replacing already downloaded media of low quality will be less demanding.

To further improve the media streaming capabilities of a UE in the vicinity of a handover, there is provided an exemplary embodiment of the method for management of a playback buffer in a UE that comprises the further steps of:

obtaining S4 information based on measurements of at least one metric providing a second indication of an upcoming handover of the UE;

reducing S5 the increased lower buffer level setting to a second specified value in response to the obtained information providing the second indication of an upcoming handover of the UE.

Figure 3:
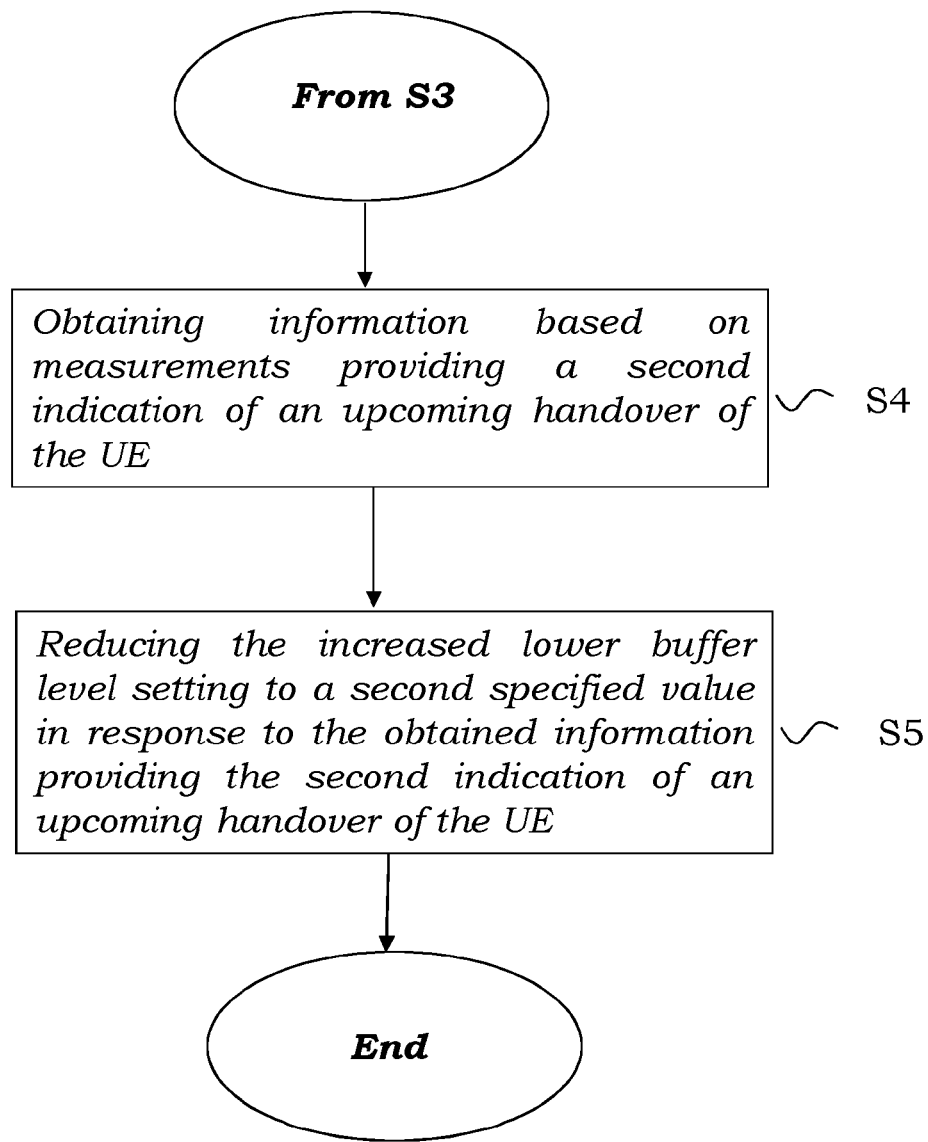
FIG. 3 is a flow diagram illustrating another exemplary embodiment of a method for management of a playback buffer in a UE according to the proposed technology.

This embodiment is schematically illustrated in the flow diagram of FIG. 3.

In other words, as the UE continues to measure particular metrics relating to the serving cell and/or the neighboring cells the information obtained S4 by these particular measurements might comprise a second indication of an upcoming handover. If the information comprises such a second indication the method proceeds to reduce the earlier increased lower buffer level setting to a second value in a step S5. The second value could be set at the level of the initial setting, that is the settings of the initially configured playback buffer, but it could also be set at any other value that is lower than the value set in the step S2 above. This particular embodiment provides the positive features that it first of all extends the amount of data contained in the buffer, that is, it prolongs the media streaming time, by having an increased upper buffer level setting. Secondly, since the lower buffer level settings might be used to trigger further requests for downloading data the second value might be chosen to better balance the amount of media contained in the buffer and the risk of downloading media of poor quality.

The value of the reduced lower buffer level settings might be chosen differently from the initially set value of the lower buffer level setting to cater for such potential imbalances. That is, by having the reduced lower buffer level setting at a value larger than the initially set lower buffer level setting one ascertains that all necessary steps are taken to ensure that the buffer is not emptied. That is, new segments are requested at an earlier junction than would be the case if the lower buffer level settings were reduced to their initially set value. The reduced lower buffer level setting might however also be reduced to the initially set value, or to a value close to the initially set value. This might be preferred if it is deemed necessary to reduce the risk that the downloaded media content is of poor quality.

There are a number of possible handover measurements that can be used to obtain S4 information providing a second indication that a handover is potentially upcoming. Non-saturating examples include metrics such as Reference Signal Received Power, RSRP, Reference Signal Received Quality, RSRQ, (in LTE system), or Received Signal Code Power, RSCP, or Ec/Io (in UMTS network) or Channel Quality Indication, CQI, or path-loss or Received Signal Strength Indication, RSSI, in WiFi. If the network specifies the measurement entities that the UE shall perform these measurements can be used to obtain the first indication of a potential handover.

In a particular embodiment the above mentioned step S5 of reducing the lower buffer level setting to a second specified value also provides a useful trigger point for the UE to make a request for a new media data.

Figure 4:
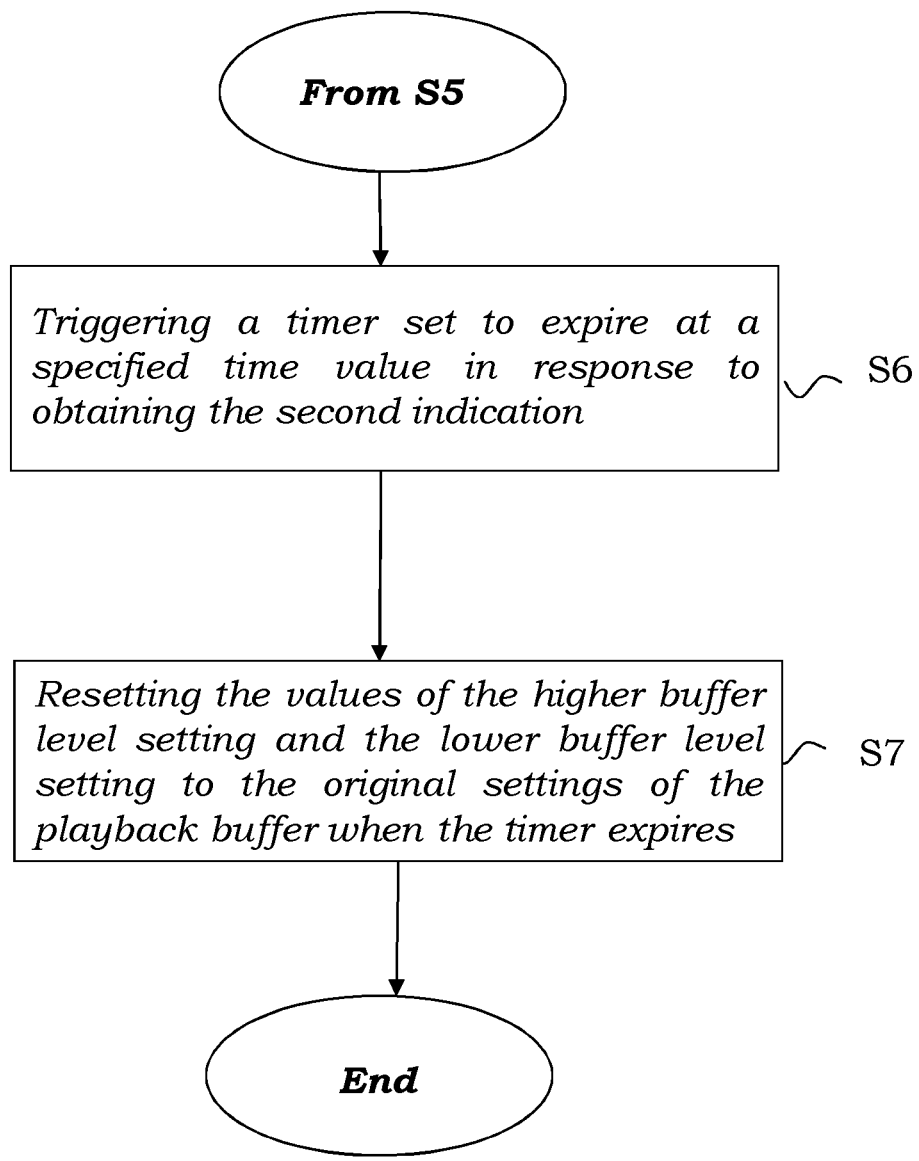
FIG. 4 is a flow diagram illustrating still another exemplary embodiment of a method for management of a playback buffer in a UE according to the proposed technology.

Yet another embodiment of the method is illustrated in the flow diagram of FIG. 4. In this embodiment there is provided a method for management of a playback buffer in a UE that comprises the further the steps of:

triggering S6 a timer set to expire at a specified time value in response to obtaining the second indication of an imminent handover of the UE;

resetting S7 the values of the higher buffer level setting and the lower buffer level setting to the original settings of the playback buffer when the timer expires.

In other words, when a second indication has been obtained, the method triggers, in a step S6, a timer with a particular timer expiration time. When this time has expired the method acts to reset the playback buffer levels to the original settings of the playback buffer. This step S7 of resetting the buffer level settings should be performed when it is deemed that the handover has been completed. The timer expiration time should therefore be set to correspond to a time when the handover essentially has been completed. These steps are performed in order to ascertain that the UE has the appropriate settings when the quality of the downloaded data are deemed to be satisfactory. That is, the segment size can be made larger again after the handover has been completed, this is beneficial due to the fact that larger media segment saves battery life.

In still another embodiment of the method for management of a playback buffer in a UE, the step of resetting S7 comprises resetting the decreased media segment size setting to the original values of the playback buffer when the triggered timer expire. This is performed in order to ascertain that larger segments can be downloaded when it is deemed that the downloaded data is of sufficient quality, that is, after the handover has been essentially completed.

In a particular embodiment of the proposed technology the buffer level settings might be set so that the difference between the upper and lower level is reduced as compared to the difference of the initial configuration. Together with a reduction of the segment size the reduced difference in buffer level settings will improve the rate adaptation frequency, and also act to avoid that too many, and too large, segments of potential low rate video segments are filling the playback buffer. As an example, the playback buffer level settings might be increased in such a way that the difference between the increased upper and lower playback buffer levels is smaller than the difference of the initial or original buffer level settings. In yet another example could the difference between upper and lower buffer level settings be equal to the size or length of one media segment.

The above described embodiments of the method might also include a fallback mechanism that allows the UE to fall back to normal operations, that is, a fallback to the initial setting if it is determined that the UE moves out of the potential handover area without actually performing a handover. This can be determined by means of measurements of the same metrics used to obtain the first indication of a handover. For example, if measurements providing the HO hysteresis is used to obtain a first indication, that is, the HO hysteresis is deemed to lie below a certain threshold, further measurements could determine that the HO hysteresis has changed and that it instead lies above the threshold. This information could be used to determine that the movement of the UE has changed and that it is probable that it will remain within the serving cell. In other words, the method might comprise a step S1' of reinstating the original buffer level settings as a response to measurements providing information comprising an indication that the handover is not going to be completed.

The above described feature provides for a way to perform a dynamic adaptation of the media playback buffer size, in order to increase the amount of pending video including a change of segment size, based on the early warning of coming handover which might be based on the existing handover measurements as well as triggering offsets such as hysteresis and time to trigger.

The various embodiments of the method described above might be performed by the UE. The UE will thus measure various metrics or parameters and analyze these by means of common algorithms. Based on the outcome of the measurements and the analysis the UE will perform the various steps of the embodiments. A UE configured to manage a playback buffer will be described later in this application.

It is however also possible to have a method that can be performed outside of the UE. Thus it is proposed a method for enabling adjustment of a playback buffer in a User Equipment, UE. The method comprises the steps of:

obtaining S10 information providing a first indication of an upcoming handover of a UE
  determining S20 values specifying an increased upper buffer level setting and an increased lower buffer level setting of a playback buffer in response to the obtained information providing the first indication of an upcoming handover of the UE
  transmitting S30 the determined values to the UE to enable the UE to implement the increased upper buffer level setting and the lower buffer level settings to provide a way to obtain a larger data download prior to a potential handover.

Figure 5:
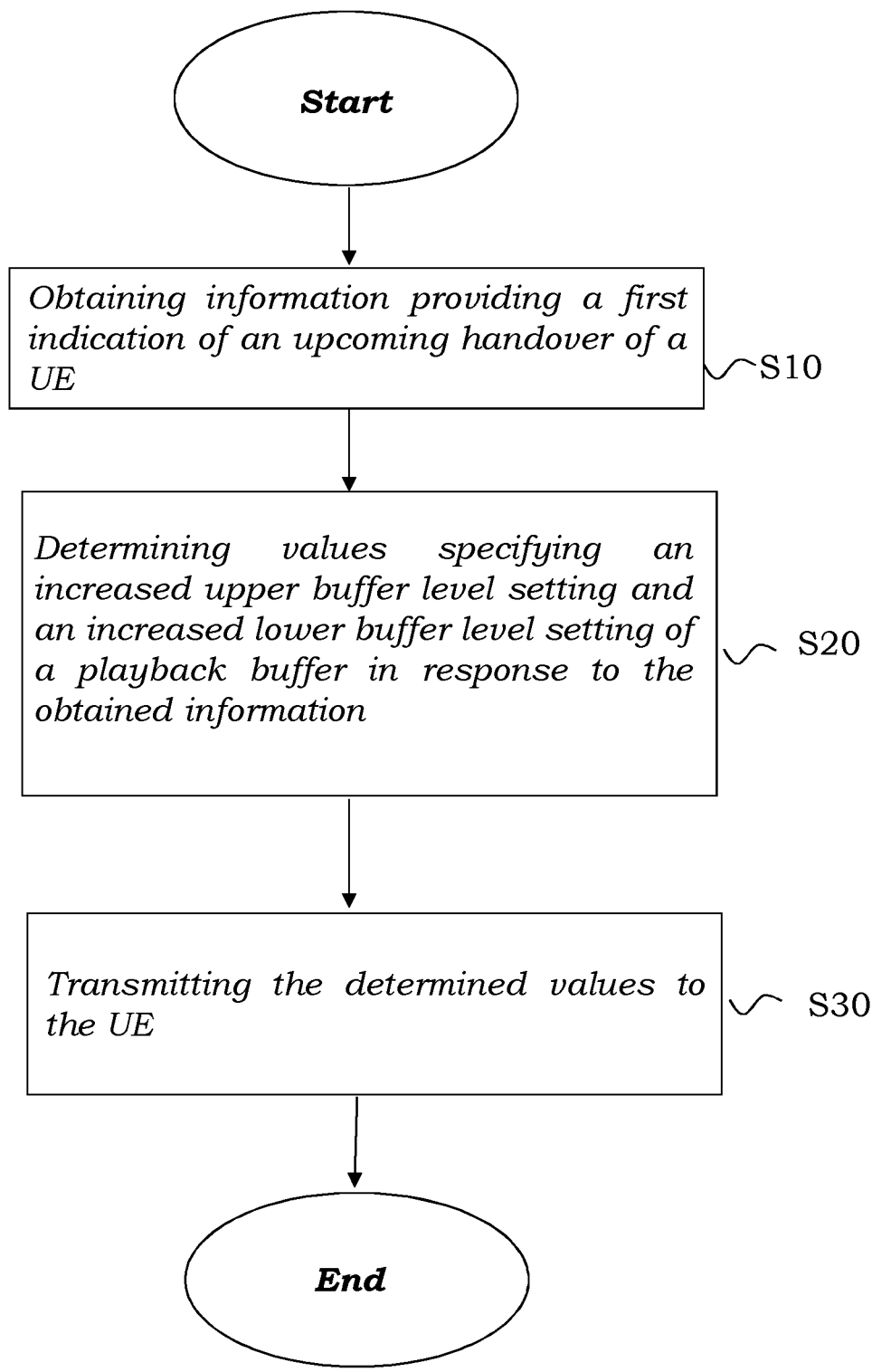
FIG. 5 is a flow diagram illustrating an embodiment of a method for enabling adjustments of a playback buffer in a User Equipment.

This embodiment is schematically disclosed in the flow diagram of FIG. 5. In other words, it is provided a method that enables a UE to adjust buffer level settings if a first indication that the UE might be subject to a handover is obtained. If such an indication is obtained the method determines, in step S20, new buffer level settings for the upper level and the lower level and transmit these settings to the UE.

All the positive features described in relation to the earlier described method are equally valid for the above embodiment as well as those described below. In other words the various corresponding steps in the different embodiments provide for the same beneficial consequences.

Figure 6:
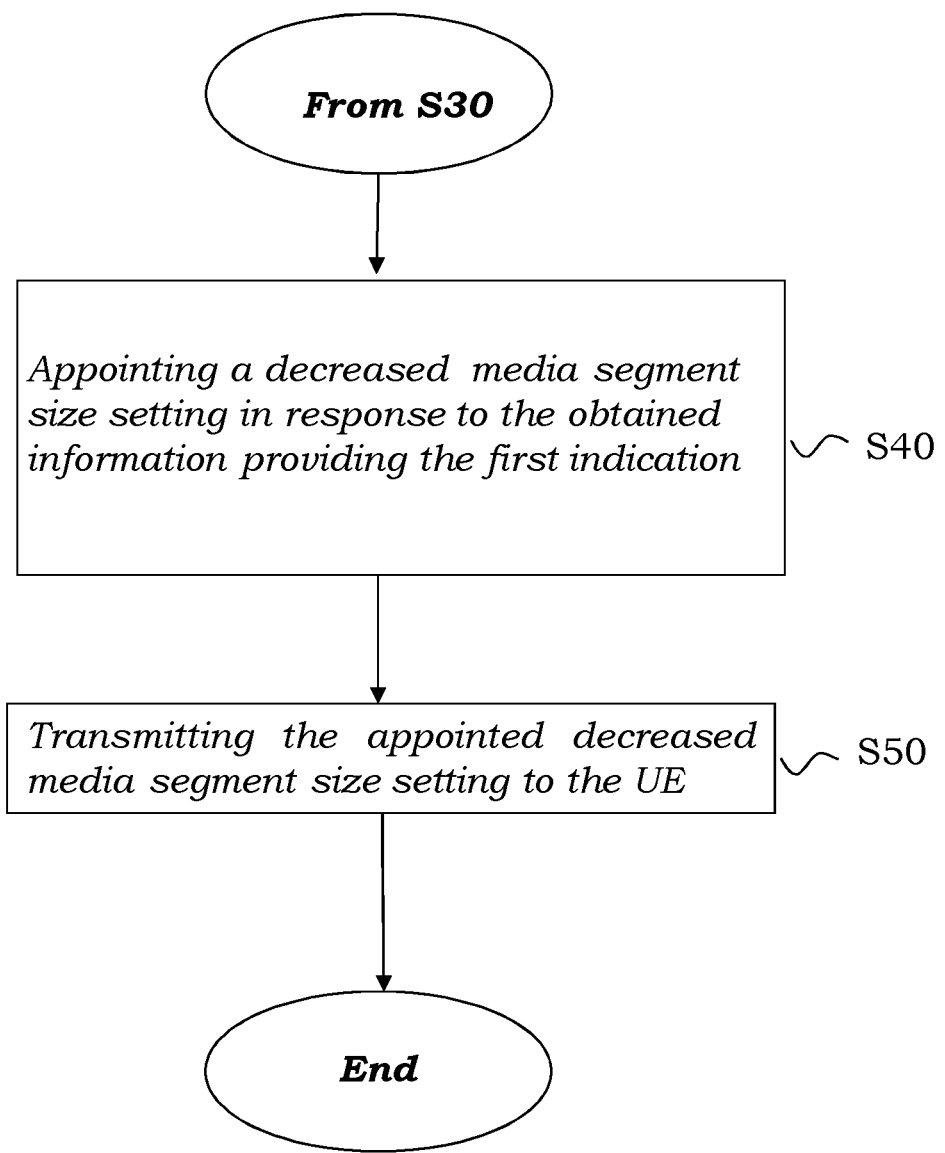
FIG. 6 is a flow diagram illustrating an exemplary embodiment of a method for enabling adjustments of a playback buffer in a User Equipment.

Further positive features might be obtained by a particular embodiment of the method, schematically illustrated in the flow diagram of FIG. 6, where the method for enabling adjustment of a playback buffer in a User Equipment, UE also comprises the steps of:

appointing S40 a decreased media segment size setting of a pre-configured playback buffer setting in response to the obtained information providing the first indication of an upcoming handover of the UE;
  transmitting S50 the appointed decreased media segment size setting to the UE to enable a reduction in the buffering of a large amount of low rate playback segments and/or a reduction of buffer underrun.

That is, in step S40 it is appointed, or assigned, a decreased media segment size setting that is transmitted, in a step S50, to the UE. This decreased media segment size setting should be used instead of the original media segment size setting used in the playback buffer.

Figure 7:
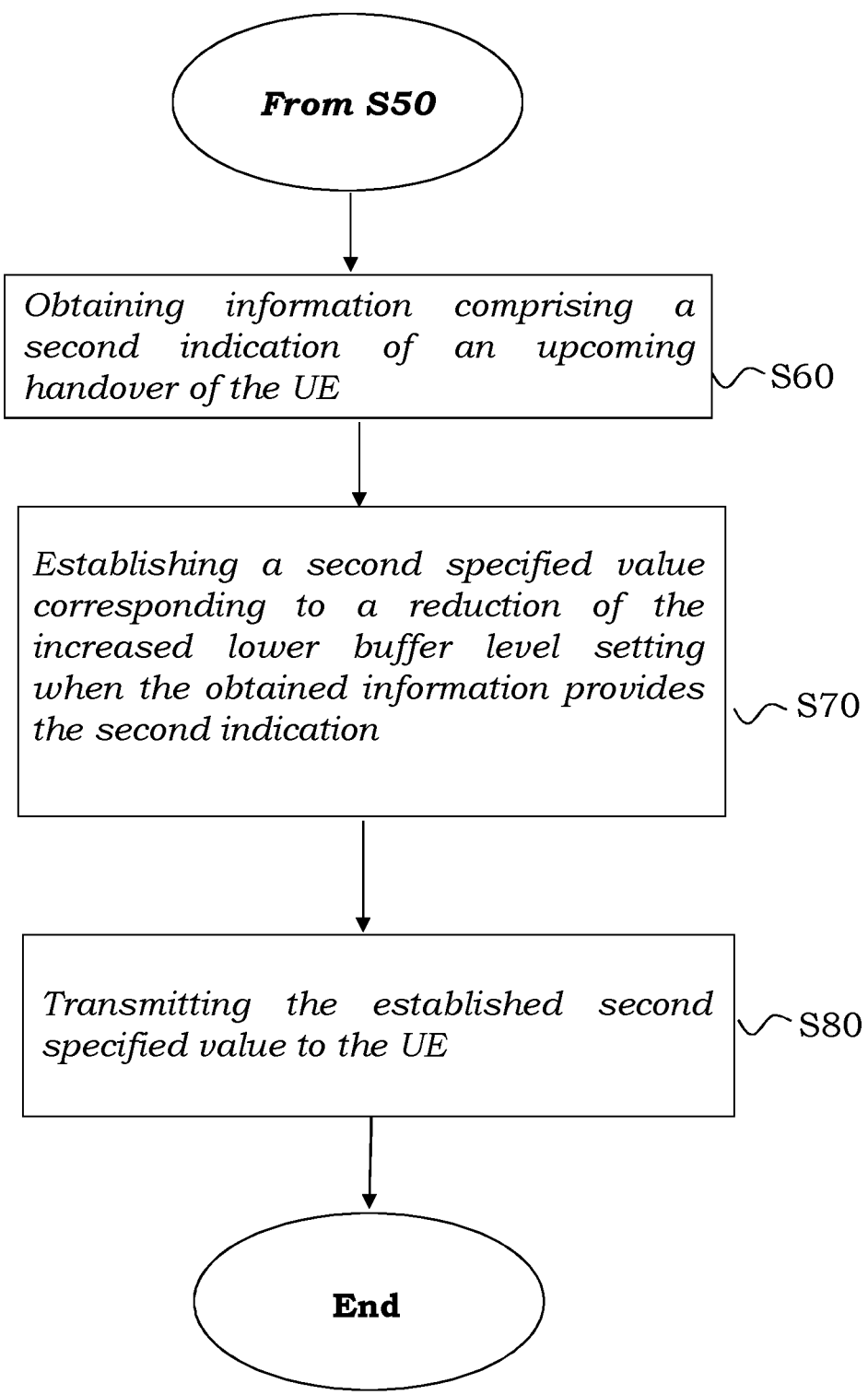
FIG. 7 is a flow diagram illustrating another exemplary embodiment of a method for enabling adjustments of a playback buffer in a User Equipment.

Still another embodiment of the method is schematically illustrated in the flow diagram of FIG. 7, here the method for enabling adjustment of a playback buffer in a User Equipment, UE comprises the further steps of:

obtaining S60 information comprising a second indication of an upcoming handover of the UE;
  establishing S70 a second specified value corresponding to a reduction of the increased lower buffer level setting to a new lower buffer level setting when the obtained information provides the second indication of an upcoming handover of the UE;

transmitting S80 the established second specified value to the UE to enable the UE to implement the new lower buffer level setting.

This particular embodiment provides the positive features that it first of all provide a way for a UE to extend the amount of data contained in the buffer. That is, by enabling an increase of the amount of downloaded data it prolongs the media streaming time. Secondly, since the lower buffer level settings might be used to trigger further requests for downloading data the second value might be chosen to better balance the amount of media contained in the buffer and the risk of downloading media of poor quality.

As was described earlier, the value of the reduced lower buffer level settings might be chosen differently from the initially set value of the lower buffer level setting to cater for such potential imbalances. That is, by having the reduced lower buffer level setting at a value larger than the initially set lower buffer level setting one ascertains that all necessary steps are taken to ensure that the buffer is not emptied. The reduced lower buffer level setting might however also be reduced to the initially set value, or to a value close to the initially set value. This might be preferred if it is deemed necessary to reduce the risk that the downloaded media content is of poor quality.

Figure 8:
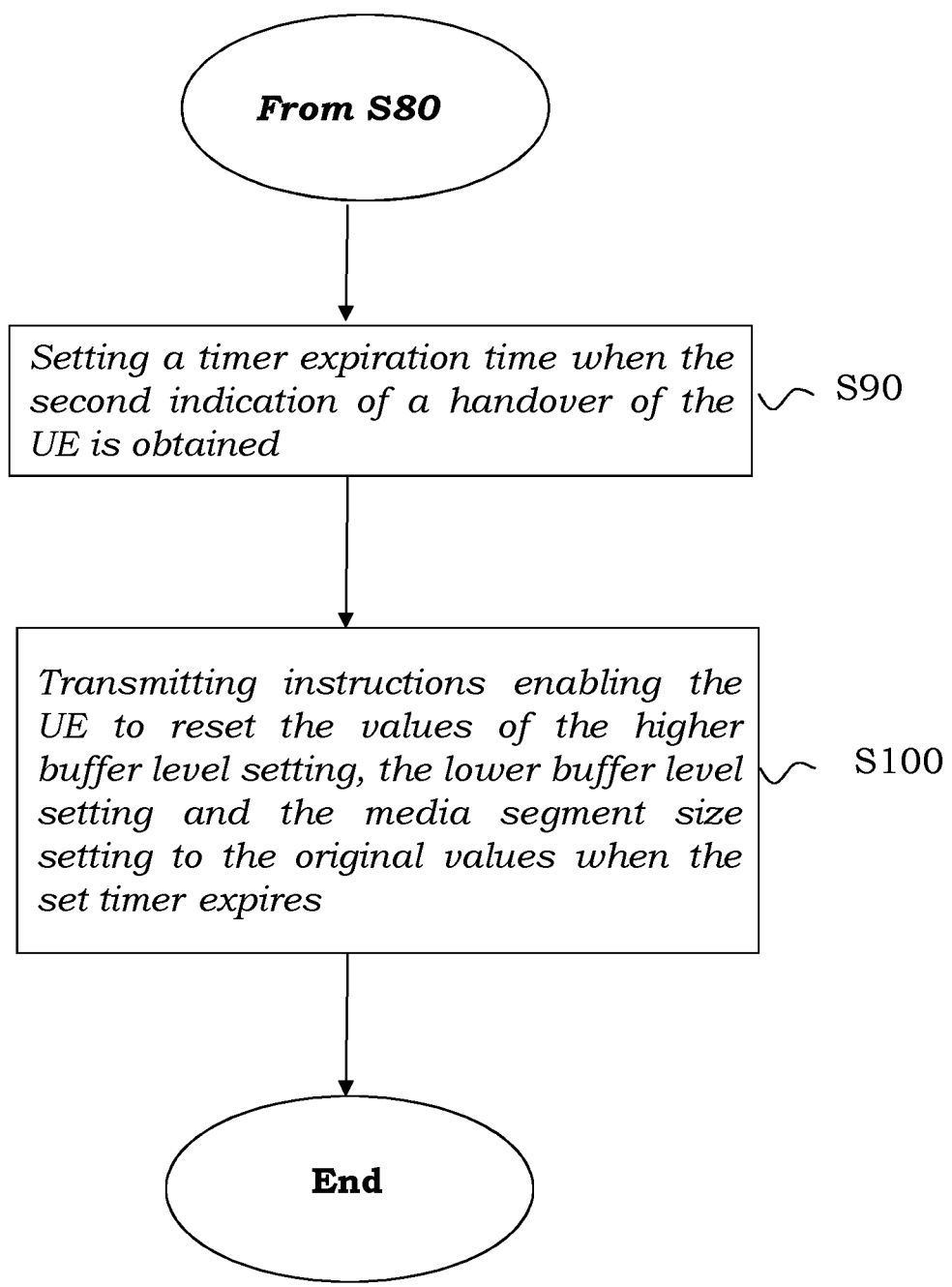
FIG. 8 is a flow diagram illustrating still another exemplary embodiment of a method for enabling adjustments of a playback buffer in a User Equipment.

Another embodiment of the method is schematically illustrated in FIG. 8. The embodiment discloses a method for enabling adjustment of a playback buffer in a User Equipment, UE that comprises the steps of:
  setting S90 a timer expiration time when the second indication of a handover of the UE is obtained;
  transmitting S100 instructions to the UE enabling the UE to reset the values of the higher buffer level setting, the lower buffer level setting and the media segment size setting to the original values of the playback buffer when the set timer expiration time expires.

The timer expiration time that is set in step S90 might be a calculated value based on the approximate time when the handover is deemed to have been completed, this approximate time could be calculated based on performed measurements. The timer expiration time could also be a pre-set time that is large enough to ascertain that the handover has been essentially completed.

In yet another embodiment of the method for enabling adjustments of a playback buffer in a User Equipment, UE will the step S100 of transmitting instructions comprise transmitting the value of the set timer expiration time to the UE enabling the UE to trigger a timer and reset the values of the higher buffer level setting, the lower buffer level setting and the media segment size setting to the original values of the playback buffer when the set timer expires.

That is, the method sets a timer expiration time and transmits this time to the UE. In this way it enables the UE to trigger a timer that expires at the set timer expiration time. When this timer expires to UE acts to reset the altered buffer values to the original values.

In an alternative embodiment of the method for enabling adjustment of a playback buffer in a User Equipment, UE, the step S90 of setting a timer expiration time comprises triggering a timer provided with the timer expiration time and the step S100 of transmitting instructions comprises transmitting instructions to the UE instructing the UE to reset the values of the higher buffer level setting, the lower buffer level setting and the media segment size setting to the original values of the playback buffer when the timer expiration time of the triggered timer expires.

Here, instead of transmitting a timer expiration time to the UE, the method instead triggers a timer and transmits instructions to the UE after the timer has expired.

Figure 9:
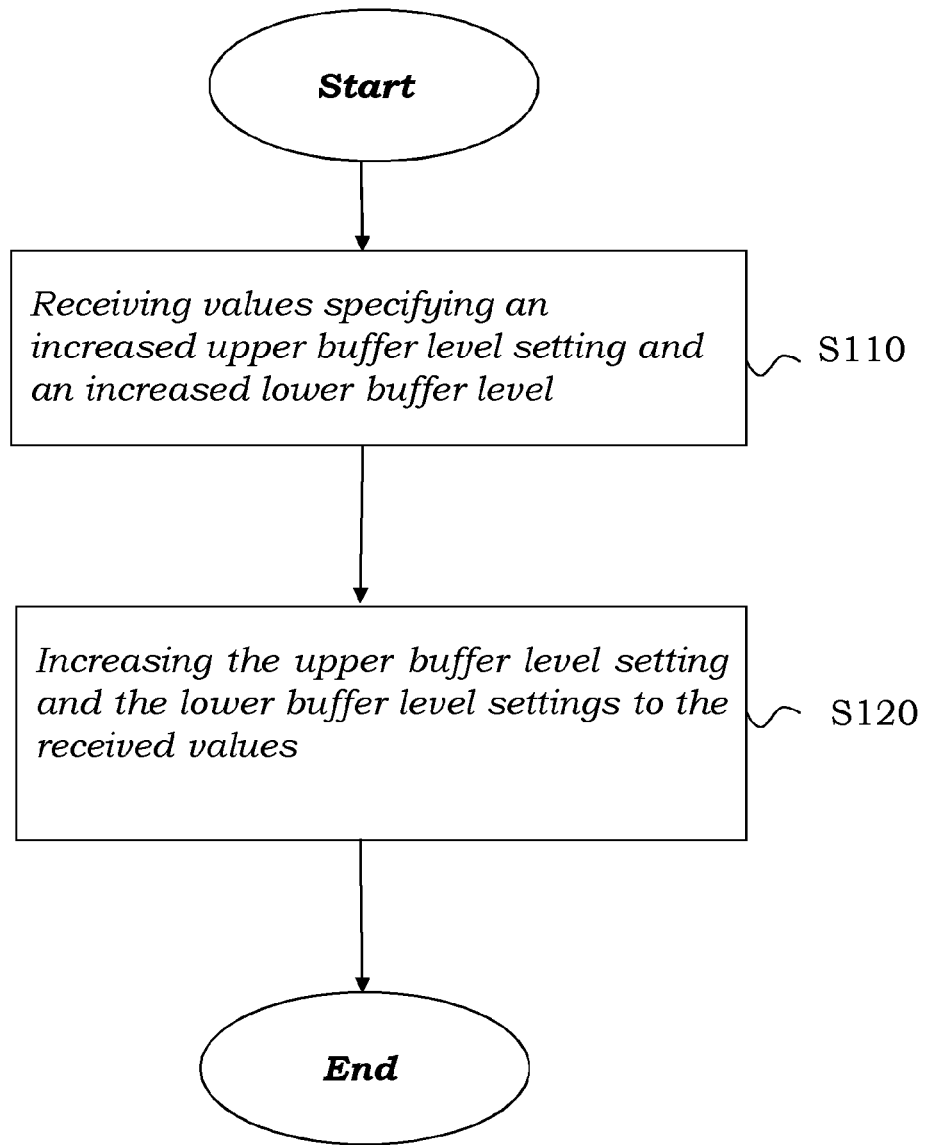
FIG. 9 is a flow diagram illustrating an embodiment of a method for adjusting a playback buffer in a User Equipment, UE.

The proposed technology also provides an alternative method for adjusting a playback buffer in a User Equipment, UE, based on received information. This is schematically illustrated in the flow diagram of FIG. 9. In other words, it is provided a method for adjusting a playback buffer in a User Equipment, UE. The method comprises the steps of:
  receiving S110 values specifying an increased upper buffer level setting and an increased lower buffer level setting of a playback buffer;
  increasing S120 the upper buffer level setting and the lower buffer level settings to the received values to provide a way to obtain a larger data download prior to a potential handover.

Figure 17:
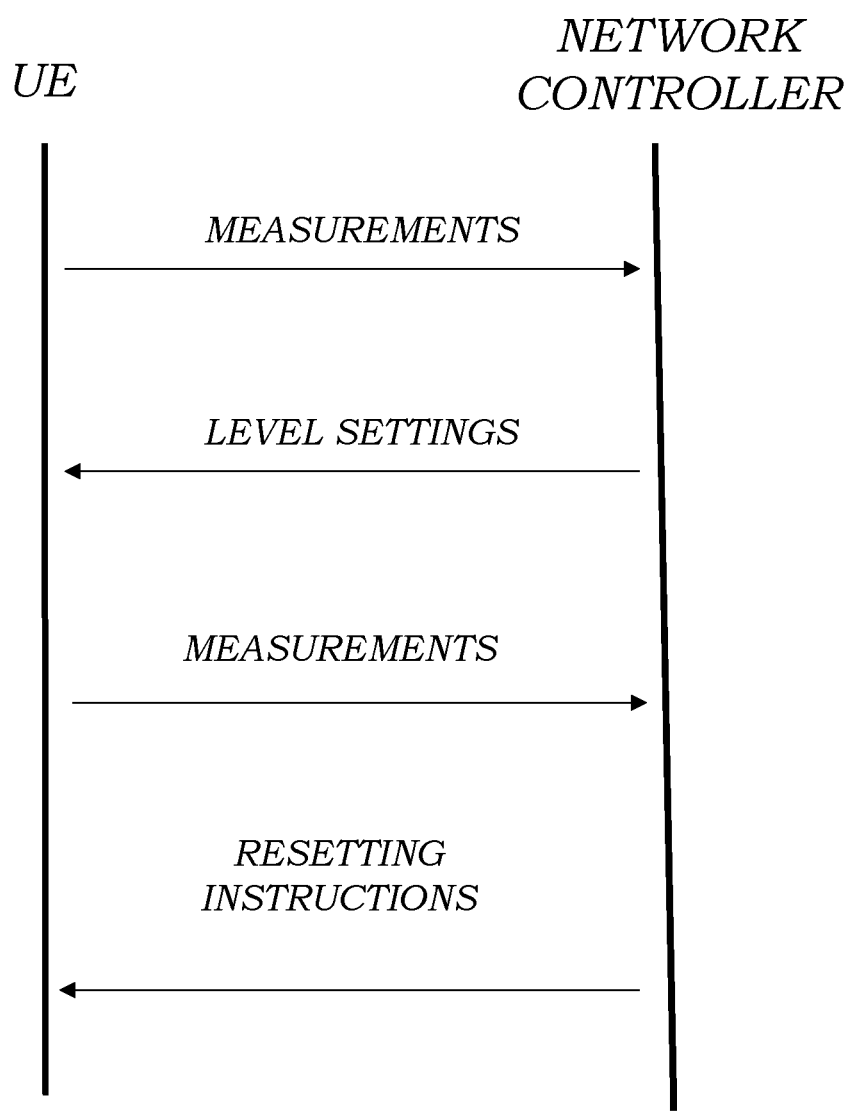
FIG. 17 is a signaling diagram illustrating an exemplary sequence of information transmitted between a User Equipment and a network controller.

A signaling diagram illustrating a possible exchange of information between a network controller and a UE is schematically illustrated in FIG. 17. Here it is shown the particular embodiment where a UE performs measurements and transfers these measurements to the network controller. The network controller analyses the measurements and transmit instructions comprising new and increased buffer level settings. The UE continues to transmit measurements to the network controller, and when the network controller establishes that the handover is completed, based on information comprised in the received measurements, it transmit instructions to the UE that the UE can reset the buffer level settings to the original, or initial, values.

Still another exemplary embodiment of a method for adjusting a playback buffer in a User Equipment, UE, comprises the step of:
  receiving generated decreased media segment size settings, and
  implementing these settings to enable a reduction of the buffering of a large amount of low rate playback segments and/or a reduction in buffer underrun.

In another particular embodiment of a method for adjusting a playback buffer in a User Equipment, UE, comprises the step to:
  receiving a specified value corresponding to a reduction of the increased lower buffer level setting to a new lower buffer level setting and
  implement the new lower buffer level setting.

Yet another exemplary embodiment provides a method for adjusting a playback buffer in a User Equipment, UE, that comprises the steps of:
  receiving a timer expiration time and trigger a timer to expire at the set timer and
  resetting the values of the higher buffer level setting, the lower buffer level setting and the media segment size setting to the original values of the playback buffer when the timer expires.

Another exemplary embodiment of a method for adjusting a playback buffer in User Equipment, UE, comprises the steps of:
  receiving instructions comprising instructions to reset the values of the higher buffer level setting, the lower buffer level setting and the media segment size setting to the original values of the playback buffer, and
  resetting the values of the higher buffer level setting, the lower buffer level setting and the media segment size setting to the original values of the playback buffer in response to the instructions.

Having described particular embodiments of proposed methods, in what follow we will provide some examples of particular implementations of the steps and particular uses of the methods in specified network environments. These examples should not be construed as limiting the scope of the proposed methods to the described environments. The methods as have been described can be used in all kind of network environments where a UE might be subject to a handover.

As a first example of the method we will give a schematic outline of the method as used in a Long Term Evolution, LTE, network.

Common for a lot of cellular networks is that the UE periodically measures particular metrics of neighboring cells to obtain measures of the signal quality in those particular cells as compared to the serving cell. The measurement reports for specific events will be triggered and sent to the network. In LTE network, it is typically the standardized event A3 that provides the indication to the network that the UE can be handed over to the target cell. The technology will hereafter be described from this LTE perspective. This however does not exclude its applicability to other wireless access networks, such as UMTS/3G and WiFi.

There are a number of standardized events, see e.g. [3] that can be used in the proposed technology. Briefly:

Event A1: Primary serving cell, P-Cell, becomes better than an absolute threshold.

Event A2: P-Cell becomes worse than absolute threshold.

Event A3: Neighbor cell becomes better than an offset relative to the P-Cell.

Event A4: Neighbor cell becomes better than absolute threshold.

Event A5: P-Cell becomes worse than one absolute threshold and neighbor cell becomes better than another absolute threshold.

Event A6: Neighbor cell becomes better than an offset relative to a secondary cell, S-Cell.

Here we will briefly describe the use of the standardized event A3. Event A3 resides on the fact that a neighbor cell becomes better than an offset relative to the primary cell. That is, the cell, operating on the primary frequency, in which the UE either performs the initial connection establishment procedure or initiates the connection re-establishment procedure, or the cell indicated as the primary cell during a handover procedure.

Figure 10:
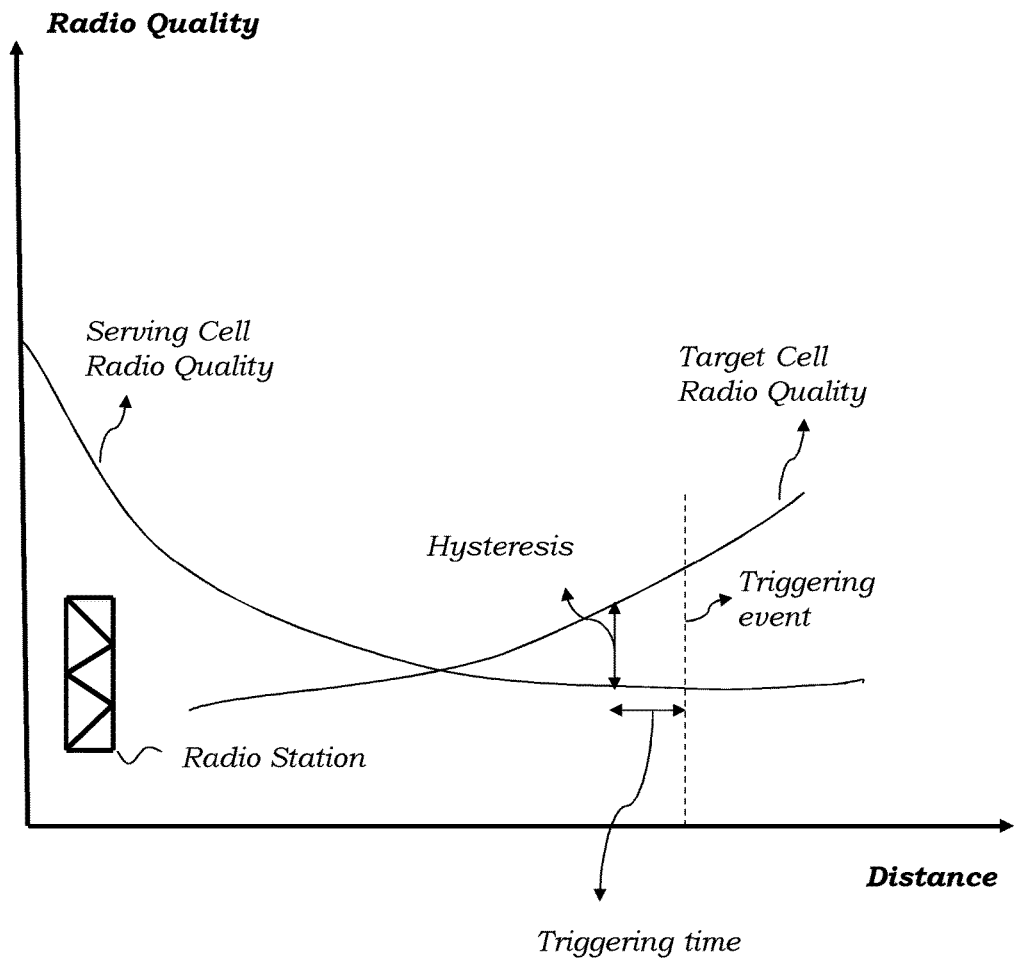
FIG. 10 is a drawing schematically showing how radio signal quality can be used to adjust a playback buffer in a User Equipment in case of a potential handover.

To be able to obtain a first indication, or an early warning, when a UE are about to perform a handover, the method might use information comprising an offset configured to an A3 event criteria (RSRP, RSRQ, path-loss, or CQI measurement) This handover warning might surface when the UE measurement satisfies some threshold condition in addition to an A3 event threshold. This could provide the first indication that will trigger a UE to perform the step of increasing the upper and lower buffer levels and optionally to reduce the media segment size. This is illustrated in FIG. 10 for the particular case that the indication is obtained by using information about the HO hysteresis.

The method might also comprise a way to return to normal operation by resetting the values to the original values if and when the handover has been performed. That is, the level settings will be reset when the UE has finished the serving cell change. This could for example be based on the A3 trigger event. The second indication might thus also be an offset to the A3 trigger event, but not as big offset as for the first indication. The second indication of an upcoming handover triggers the client to perform the step of reducing the lower threshold and trigger a timer. When this timer expires it indicates that the handover has been completed and that the client might perform the necessary steps of resetting the adjusted values and return to the original buffer level settings.

Figure 11:
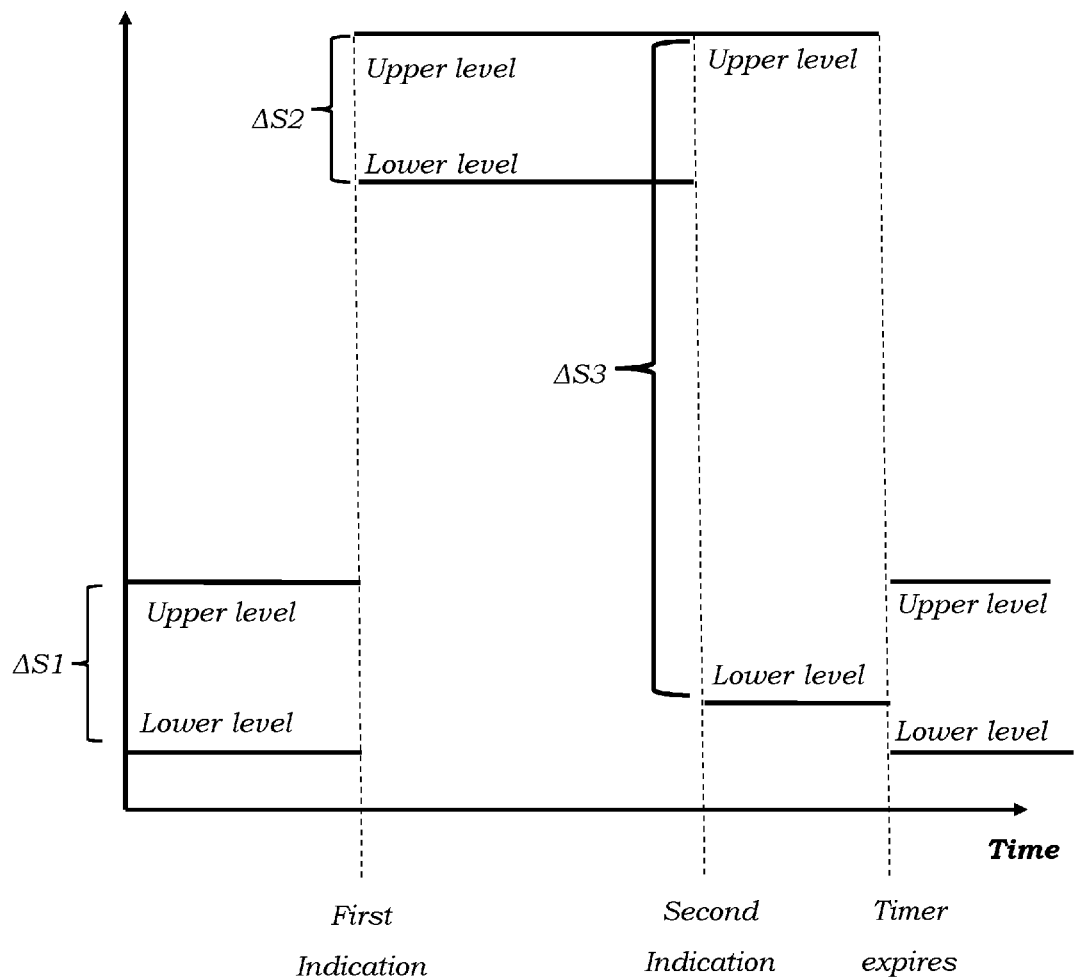
FIG. 11 is a schematic drawing illustrating how buffer level settings are adjusted over time.

To further clarify the workings of this particular embodiment reference is made to FIG. 11. Here it is shown that both the upper and lower levels, which could be the maximum and minimum levels, respectively, are adapted during a time prior to a handover. At the first indication, or equivalently, the first adaptation indication the buffer level settings are increased, and the difference $\Delta S2$ between the upper and lower level might be reduced in comparison with the difference $\Delta S1$ of the initial configuration. Together with a reduction of the segment size the reduced difference $\Delta S2$ in buffer levels will improve the rate adaptation frequency, and also act to avoid that too many, and too large, segments of potential low rate video segments are filling the playback buffer.

When the second indication, or equivalently the second adaption indication, triggers, which could be determined to happen at a particular offset to the A3 LTE handover, the lower level setting of the playback buffer is reduced. At this point there is a difference $\Delta S3$ between the upper and lower level settings. This is done in order to avoid that the UE request new media segments during periods of low throughput which would cause the media rate to be reduced and the buffer to be filled with lower rate video segments. Further, this will also reduce the delivered data during user plane interruption and avoid packet losses if the packet forwarding is not enabled for handover. Packet forwarding is feasible and optional in LTE, in UMTS network packets in the source cell will be dropped during handover procedure.

When a period of time has expired since the second indication triggered, the method acts to reset the buffer level setting to their original, or initial, operation settings.

Below it is provided a schematic example to facilitate the understanding of a how settings might be chosen based on measurements and statistics. The example is purely illustrative and should not be construed as limiting. The provided examples of settings can be used in the method that can be implemented in a UE as well as the method that could be implemented in a network controller.

Referring again to FIG. 11, the settings of the upper and lower buffer level settings are during normal operations based on requirements of initial delay until playback start and is further a tradeoff between resilience to buffer underrun and user abandonment probability respectively. The other settings such as the first and second indications might also have default settings. However, also these can be adapted or adjusted by following some simple outlines as will be explained in what follows.

Besides pre-determined settings there are a number of way to provide the settings used in the proposed technology. In a first example, a first assumption is made on the minimum acceptable media rate, MR, that a user may find satisfying. This rate might be used to calculate and adjust all the other settings.

As a purely illustrating example, the difference between the lower level in normal operations and the increased lower level might be equal to the estimated time that the throughput in average lies below the MR. This time period is referred to as Time Low Rate (TLR), based on this the increased lower level will set at Lower+ TLR, where Lower represent the original or initial setting. Stated slightly different, under the assumption that there is provided a measure of the minimum acceptable video rate, MR, the difference between the lower level in normal operations and the increased lower level should be equal to the estimated time that the throughput in average is below the MR, this time period represents the Time Low Rate, TLR.

Hence, one example setting of the increased low level amounts to the setting increased lower level setting=initial lower level+TLR, given in seconds. The MR measure might be taken from quality of service investigations which often are presented with a user Mean Opinion Score (MOS) for a given video rate and resolution. A particularly valued MOS may then be selected as the satisfaction criteria of a user. In this case a particularly valued MOS would correspond to a given video rate which would represent the MR measure.

As another example, the TLR might be taken from measurements of user throughputs in a cell in combination with handover measurements. A certain specified example an example that correlates the handover measurements reports with the user throughput and build statics per cell conserving the neighbor cells that is considered in the handover measurements report. This correlated information might then be processed to distill what throughput is achieved in different areas of the cell. Based on this the TLR can be determined, and also the offset value(s) to particular events, such as the A3 event, that might be used in relation to the proposed technology. Therefore, by correlating the user throughput with measurement reports, and potentially also UE quality reports, the settings, such as the offsets to the A3 event, TLR, can be iterated to find an optimal setting per cell and potentially also per UE.

The upper level might, for example, be set so that the difference between the upper and lower level in the potential handover area correspond to the minimum segment size available for the UE to request from.

The first indication, or equivalently the first adaptation indication, might have a default setting associated to an additional offset to the HO area hysteresis. This adapted indication might be based on whether the UE will have time to fill up the TLR before the throughput falls below MR.

The timer setting could in particular be set to the TLR value, and the timer is started at the second indication, or equivalently, the second adaptation indication, which is an offset to the A3 trigger event. It should be noted that the offset in this case might be set in such a way that the second indication is triggered based on the A3 trigger event.

It is possible to provide the UE or the network controller with default settings upon installment.

The UE could measure the throughput values when the method is initiated by means of the first indication, and then adjust the TLR. The other settings that are dependent on the TLR could then be adjusted to thereby provide more appropriate settings in the environment that the UE moves in.

The above described embodiments might also include a fallback mechanism that allows the UE to fall back to normal operations, that is, a fallback to the initial setting if it is determined that the UE moves out of the potential handover area without actually performing handover. This can be determined by means of measurements of the same metrics used to obtain the first indication of a handover. For example, if measurements providing the HO hysteresis is used to obtain a first indication, that is, the HO hysteresis is deemed to lie below a certain threshold, further measurements could determine that the HO hysteresis has changed and that it instead lies above the threshold. This information could be used to determine that the movement of the UE has changed and that it is probable that it will remain within the serving cell. In other words, the method might comprise a step S1' of reinstating the original buffer level settings as a response to measurements providing information comprising an indication that the handover is not going to be completed.

The proposed technology also provides a User Equipment, UE, configured to manage a playback buffer, wherein the UE is configured to
  obtain information based on measurements of at least one metric that provides a first indication of an upcoming handover of the UE; and configured to
  increase an upper buffer level setting and a lower buffer level setting of the playback buffer to corresponding specified values in response to the obtained information providing the first indication of an upcoming handover of the UE.

A particular embodiment of a UE comprises a processor 122 and a memory 124, the memory comprising instructions executable by the processor, whereby the processor is operative to increase an upper buffer level setting and a lower buffer level setting of the playback buffer to corresponding specified values in response to the obtained information providing a first indication of an upcoming handover. This is schematically illustrated in the block diagram of FIG. 12b.

Yet another version of a UE according to above comprises processing circuitry 125 and also communication circuitry 110 configured to obtain information comprising a first indication of an upcoming handover. This embodiment in schematically illustrated in FIG. 12a.

Figure 13:
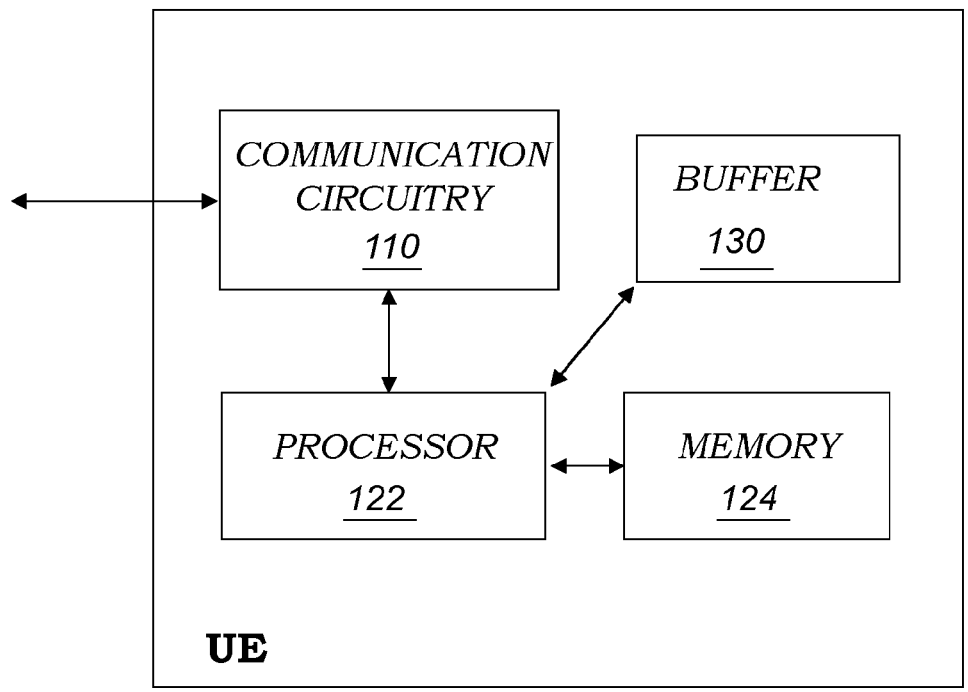
FIG. 13 is a block diagram illustrating an exemplary embodiment of a UE.

Still another embodiment of a UE is schematically illustrated in FIG. 13. Here the UE comprises a processor 122, memory 124 and communication circuit 110. A buffer 130 residing in the UE is also shown schematically. The buffer could either be integrated in the ordinary memory or separate from the memory and processor, but it could also be in the form of a virtual data buffer in case of software.

In a particular embodiment of a UE configured to manage a playback buffer is the UE configured to decrease a media segment size setting to a specified size value in response to the obtained information providing the first indication of an upcoming handover to thereby reduce buffering of a large amount of low rate playback segments and/or reduce buffer underrun.

In another exemplary embodiment of a UE configured to manage a playback buffer is the UE configured to:
  obtain information based on measurement of at least one metric comprising a second indication of an upcoming handover; and configured to
  reduce the increased lower buffer level setting to a second specified value in response to the obtained information providing the second indication of an upcoming handover.

Still another embodiment of a UE configured to manage a playback buffer discloses a UE that is configured to:
  trigger a timer set to expire at a set value in response to the obtained information providing a second indication of an upcoming handover; and configured to
  reset the values of the higher buffer level setting, the lower buffer level setting to the original values of the playback buffer when the timer expires.

In a particular embodiment of a UE configured to manage a playback buffer, is the UE configured to reset the values of the decreased media segment size setting to the original values of the playback buffer when the timer expires.

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the term "wired device" may refer to any device configured or prepared for wired connection to a network. In particular, the wired device may be at least some of the above devices, with or without radio communication capability, when configured for wired connection.

The proposed technology also provides a network controller configured to enable adjustment of a playback buffer in a User Equipment, UE, prior to a potential handover. The network controller is configured to:
  obtain information, based on measurements of at least one metric, providing a first indication of an upcoming handover of a UE; and configured to
  determine values specifying an increased upper buffer level setting and an increased lower buffer level setting of a playback buffer in response to the obtained information providing the first indication of an upcoming handover of the UE; and configured to
  transmit the determined values to the UE to thereby enable the UE to implement the increased upper buffer level setting and the lower buffer level settings to provide a way to obtain a larger data throughput prior to a potential handover.

An exemplary embodiment of a network controller discloses a network controller that comprises a processor 122 and a memory 124, the memory 124 comprising instructions executable by the processor, whereby the processor is operative to determine values specifying an increased upper buffer level setting and a lower buffer level setting of a pre-configured playback buffer if the obtained information provides a first indication of an upcoming handover of the UE. Such a network controller is schematically illustrated in the block diagram of FIG. 12b.

Figure 12A:
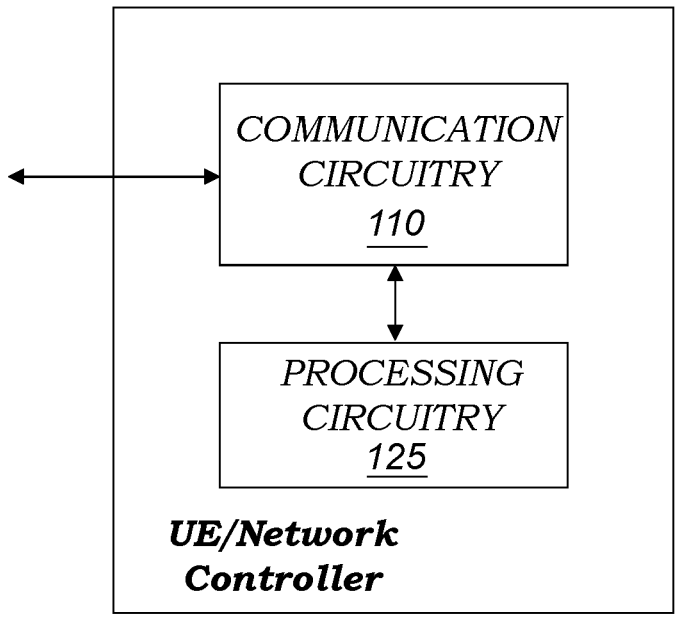
FIG. 12*a* is a block diagram illustrating an exemplary embodiment of a UE and a network controller.
Figure 12B:
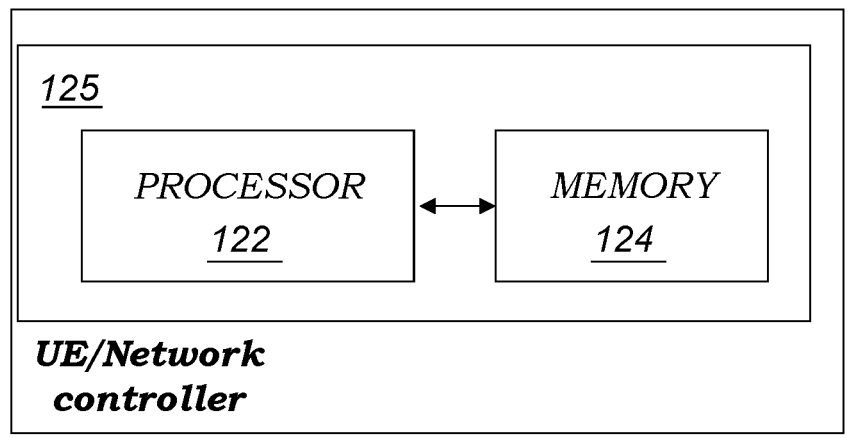
FIG. 12*b* is a block diagram illustrating an alternative exemplary embodiment of a UE and a network controller.

Another exemplary embodiment of a network controller, discloses a network controller that comprises processing circuitry 125 and communication circuitry 110 configured to obtain information providing a first indication of an upcoming handover of the UE and configured to transmit the determined values specifying an increased upper buffer level setting and an increased lower buffer level setting of a pre-configured playback buffer to the UE. A block diagram illustrating such an exemplary network controller is shown in FIG. 12a.

In a particular embodiment of a network controller configured to enable adjustment of a playback buffer in a User Equipment, UE, is the network controller configured to:
  generate a decreased media segment size setting of a pre-configured playback buffer setting if the obtained information provides the first indication of an upcoming handover of the UE; and configured to
  transmit the generated decreased media segment size setting to the UE to thereby reduce buffering of a large amount of low rate playback segments and/or reduce buffer underrun.

In another particular embodiment is a Network controller configured to enable adjustment of a playback buffer in a User Equipment, UE, configured to:
  obtain information, based on measurements of at least one metric, comprising a second indication of an upcoming handover of the UE; and configured to
  establish a second specified value corresponding to a reduction of the increased lower buffer level setting to a new lower buffer level setting when the obtained information provides the second indication of an upcoming handover of the UE; and configured to
  transmit the established second specified value to the UE to enable the UE to implement the new lower buffer level setting.

Yet another exemplary embodiment provides a network controller configured to enable adjustment of a playback buffer in a User Equipment, UE, wherein the established second specified value corresponds to the value of the pre-configured lower buffer level setting.

Still another embodiment provides a network controller configured to:
  set a timer expiration time when the second indication of a handover of the UE is obtained; and configured to
  transmit the set timer expiration time to the UE to enable the UE to trigger a timer to expire at the set timer expiration time and reset the values of the higher buffer level setting, the lower buffer level setting and the media segment size setting to the original values of the playback buffer when the timer expires.

In another version of an embodiment of a network controller is the network controller configured to:
  set a timer expiration time when the second indication of a handover of the UE is obtained; and configured to
  trigger the timer provided with the set timer expiration time; and configured to
  transmit instructions to the UE to instruct the UE to reset the values of the higher buffer level setting, the lower buffer level setting and the media segment size setting to the original values of the playback buffer when the set timer expiration time expires.

A network controller according to any of the described embodiments might be provided in any type of network node, such as a radio network node, or more particularly a base station. As used herein, the non-limiting term "radio network node" may refer to base stations, network control nodes such as radio network controllers, base station controllers, gateways and the like.

In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

The proposed technology also provides a User Equipment, UE, that is configured to adjust a playback buffer. The UE is configured to:
  receive values specifying an increased upper buffer level setting and an increased lower buffer level setting of a playback buffer;

increase the upper buffer level setting and the lower buffer level settings to the received values to provide a way to obtain a larger data download prior to a potential handover.

A particular embodiment of such a UE comprises a processor 122 and a memory 124, the memory comprising instructions executable by the processor, whereby the processor is operative to increase an upper buffer level setting and a lower buffer level setting of the playback buffer to corresponding specified values in response to the obtained information providing a first indication of an upcoming handover. This is schematically illustrated in the block diagram of FIG. 12b.

Yet another exemplary embodiment of a UE according to above comprises communication circuitry 110 configured to receive values specifying an increased upper buffer level setting and an increased lower buffer level setting of a playback buffer. A block diagram illustrating this exemplary embodiment is schematically illustrated in FIG. 12a.

Still another exemplary embodiment of such a UE is schematically illustrated in the block diagram of FIG. 13.

Another exemplary embodiment of such a User Equipment provides a User Equipment, UE, that is configured to adjust a playback buffer. The UE is configured to receive generated decreased media segment size settings, and configured to implement these settings to enable a reduced buffering of a large amount of low rate playback segments and/or reduce buffer underrun.

In another particular embodiment is the User Equipment configured to receive a specified value corresponding to a reduction of the increased lower buffer level setting to a new lower buffer level setting when the obtained information and implement the new lower buffer level setting.

Yet another exemplary embodiment provides a UE that is configured to receive a timer expiration time and trigger a timer to expire at the set timer and configured to reset the values of the higher buffer level setting, the lower buffer level setting and the media segment size setting to the original values of the playback buffer when the timer expires.

In another exemplary embodiment of a User Equipment, UE, is the UE configured to receive instructions comprising instructions to reset the values of the higher buffer level setting, the lower buffer level setting and the media segment size setting to the values of the pre-configured playback buffer.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

In a particular embodiment it is provided a computer program comprising instructions, which when executed by at least one processor, cause the processor(s) to read information, providing a first indication of an upcoming handover of a UE; and increase an upper buffer level setting and a lower buffer level setting of a playback buffer to corresponding specific values in response to the obtained information providing the first indication of an upcoming handover of the UE.

Figure 14:
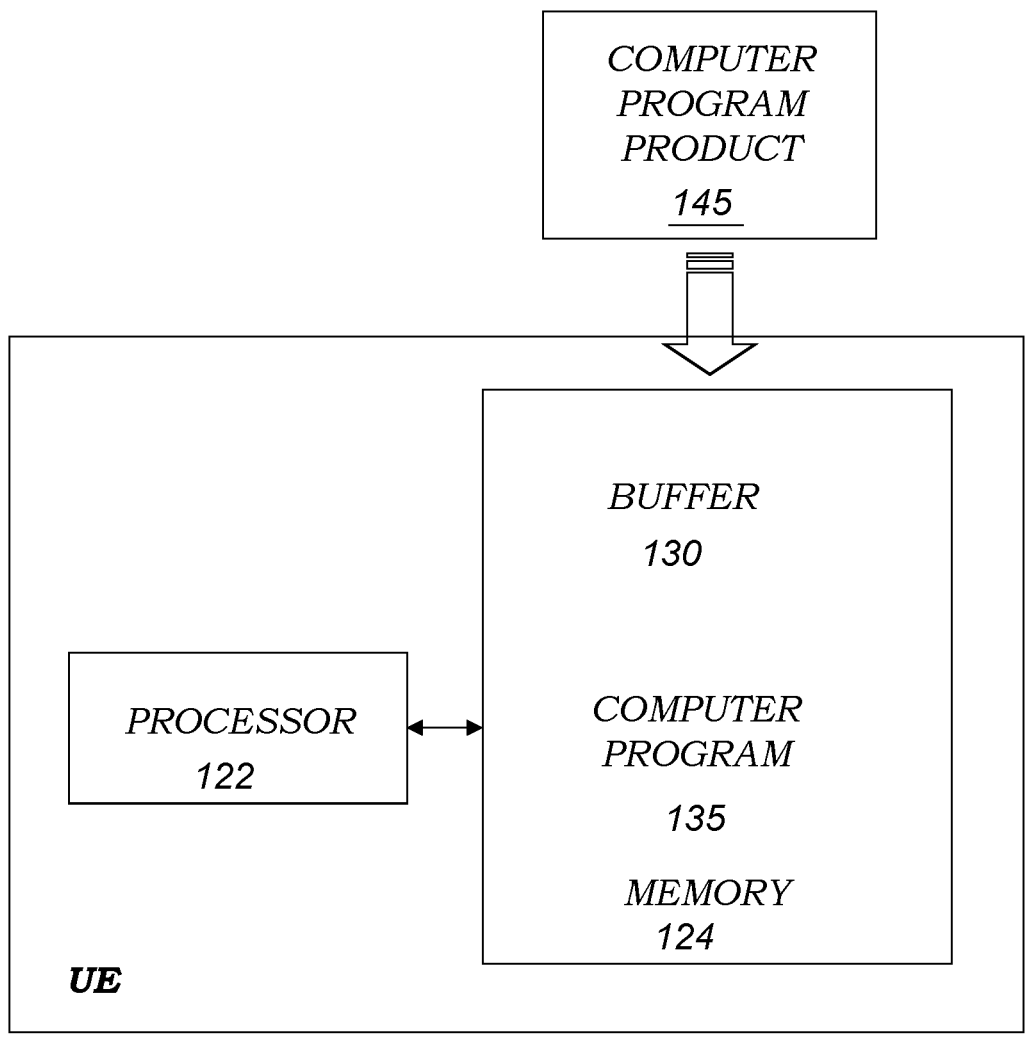
FIG. 14 is a block diagram illustrating an embodiment of a UE using a computer program according to the proposed technology.

A schematic illustration of such a computer program used by a UE or a network controller according to the proposed technology is given schematically in FIG. 14.

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

By way of example, the software or computer program may be realized as a computer program product, which is normally carried or stored on a computer-readable medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

It should also be understood that it may be possible to re-use the general processing capabilities of any conventional device or unit in which the proposed technology is implemented. It may also be possible to re-use existing software, e.g. by reprogramming of the existing software or by adding new software components.

The flow diagram or diagrams presented herein may also be regarded as a computer flow diagram or diagrams, when performed by one or more processors. A corresponding UE or network controller may be defined as a group of function modules, where each step performed by the processor corresponds to a function module. In this case, the function modules are implemented as a computer program running on the processor. Hence, the UE may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. Examples of such function modules are illustrated in FIG. 15 and FIG. 16.

Figure 15:
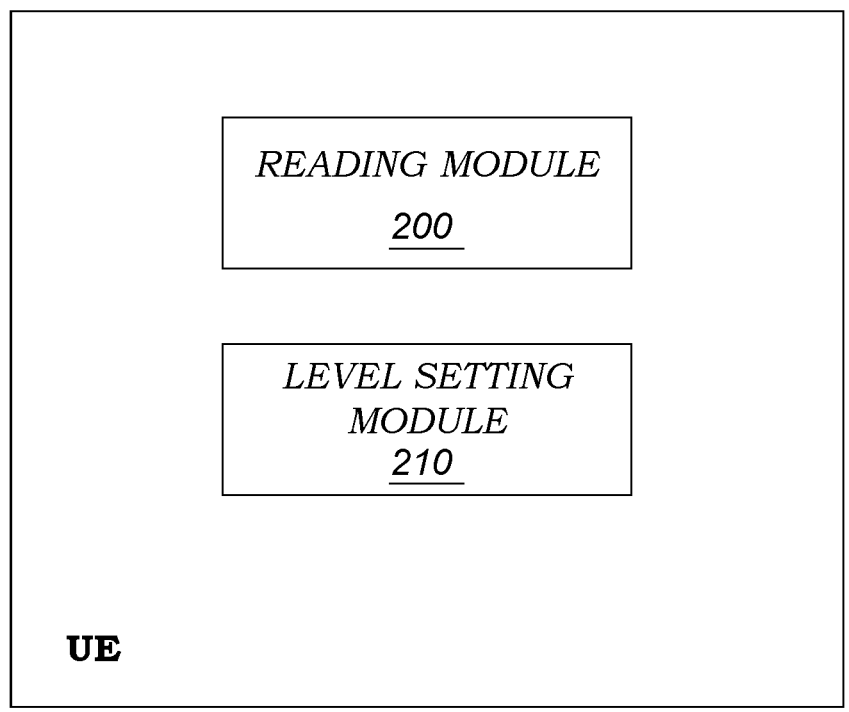
FIG. 15 is a schematic diagram illustrating a User Equipment according to an exemplary embodiment of the proposed technology.

FIG. 15 is a schematic block diagram illustrating an example of a UE comprising a group of function modules. That is, it is shown a User Equipment, UE, configured to manage a playback buffer wherein the UE comprises:
- a reading module 200 for reading information giving a first indication of an upcoming handover; and
- a level setting module 210 for increasing an upper buffer level setting and a lower buffer level setting of a playback buffer to corresponding specified values in response to the obtained information providing the first indication of an upcoming handover.

Figure 16:
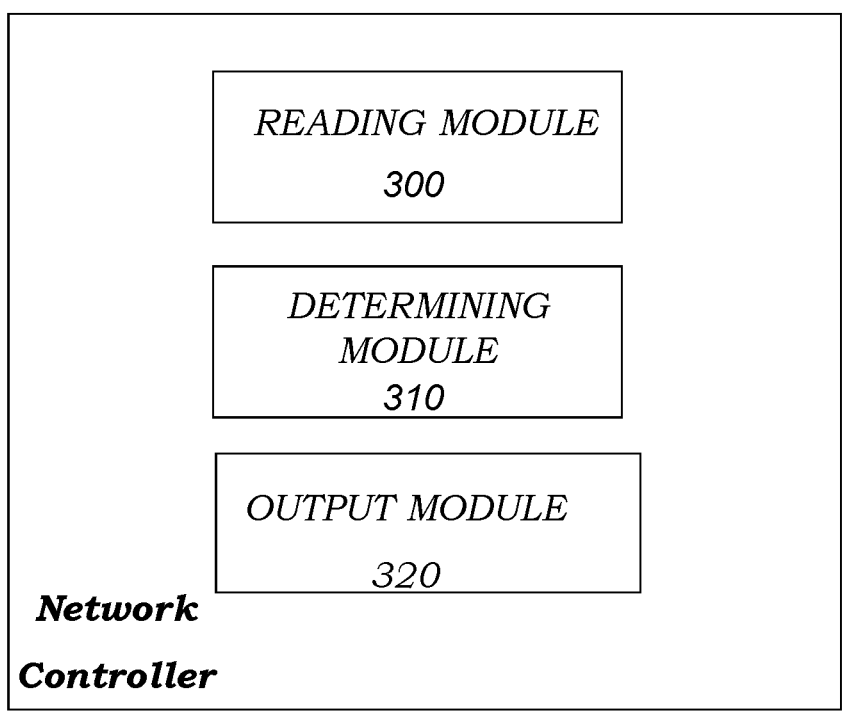
FIG. 16 is a schematic diagram illustrating a network controller according to an exemplary embodiment of the proposed technology.

FIG. 16 is a schematic block diagram illustrating an example of a network controller comprising a group of function modules. That is, it is shown a network controller configured to manage a playback buffer in a User Equipment, UE, wherein the network controller comprises:
- a reading module 300 for reading information giving a first indication of an upcoming handover of the UE; and
- a determining module 310 for determining values specifying an increased upper buffer level setting and an increased lower buffer level setting of a playback buffer in response to the obtained information providing the first indication of an upcoming handover of the UE; and
- an output module 320 for outputting the determined values for transfer to the UE to enable the UE to implement the increased upper buffer level setting and the lower buffer level settings to provide a way to obtain a larger data throughput prior to a potential handover.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1]. Paolo Bellavista et al., "Adaptive Buffering-based on handoff Prediction for wireless Internet Continuous services". Published, The 2005 International Conference on High Performance Computing and Communications (HPCC-05), September 2005.

[2]. Lars Westberg et al., "Adaptive rate transmission over a radio interface", WO 2012/130298 A1. Published Oct. 4, 2012.

[3] 3GPP," 3rd Generation Partnership Project; Technical Specification Group Radio Access Network; Evolved Universal Terrestrial Radio Access (E-UTRA); Radio Resource Control (RRC); Protocol specification (Release 12)", TS 36.331, V12.1.0, Chapter 5.5.4, Published Mar. 19, 2014

The invention claimed is:

1. A method for management of a playback buffer in a user equipment (UE), comprising:
the UE obtaining first information providing a first indication of an upcoming handover of said UE; and
in response to obtaining said first information providing said first indication of the upcoming handover of said UE, the UE dynamically adjusting buffer level settings of the playback buffer to increase an amount of pending media content in the buffer, wherein the step of dynamically adjusting buffer level settings of the playback buffer to increase the amount of pending media content in the buffer comprises:
the UE increasing an upper buffer level setting of said playback buffer to a first specified value; and
the UE increasing a lower buffer level setting of said playback buffer to a second specified value.

2. The method of claim 1, further comprising:
decreasing a media segment size setting of a playback buffer to a specified size value in response to said obtained first information providing said first indication of an upcoming handover of said UE to thereby reduce buffering of a large amount of low rate playback segments and/or reduce buffer underrun.

3. The method of claim 1, further comprising:
obtaining second information providing a second indication of an upcoming handover of said UE; and
reducing said increased lower buffer level setting to a third specified value in response to said obtained second information providing said second indication of an upcoming handover of said UE.

4. The method of claim 1, further comprising:
prior to obtaining the first information, setting the upper buffer level setting to a first initial value and setting the lower buffer level setting to a second initial value;
triggering a timer set to expire at a specified time in response to obtaining said second information providing said second indication of an upcoming handover of said UE; and
in response to the expiration of the timer:
setting the upper buffer level setting to said first initial value; and
setting the lower buffer level setting to said second initial value.

5. The method of claim 4, wherein the step of resetting further comprises resetting said decreased media segment size setting to the original values of said playback buffer when said timer expires.

6. The method of claim 1, wherein
obtaining said first information comprises receiving said first information from a network controller, wherein said first information comprises the first and second specified values.

7. A computer program product comprising a non-transitory computer readable medium storing instructions for performing the method of claim 1.

8. A user equipment (UE) configured to manage a playback buffer, wherein said UE is configured to:
receive, via an air interface, media content transmitted by a network node;
store the received media content in the playback buffer to enable playing of the media content;
obtain first information that provides a first indication of an upcoming handover of said UE; and in response to said obtained first information providing said first indication of an upcoming handover of said UE, dynamically adjust buffer level settings of the playback buffer to increase an amount of pending media content in the buffer, wherein the UE is configured to dynamically adjust the buffer level settings of the playback buffer to increase the amount of pending media content in the buffer by, at the least:
increasing an upper buffer level setting of said playback buffer to a first specified value; and
increasing a lower buffer level setting of said playback buffer to a second specified value.

9. The UE of claim 8, wherein the UE comprises a processor and a memory, said memory comprising instructions executable by the processor, whereby the processor is operative to increase the upper buffer level setting and the lower buffer level setting to said corresponding specified values in response to said obtained first information.

10. The UE of claim 8, wherein the UE is configured to obtain the first information by measuring a metric that provides an indication of an upcoming handover.

11. The UE of claim 8, wherein the UE is configured to decrease a media segment size setting to a specified size value in response to said obtained first information providing said first indication of an upcoming handover to thereby reduce buffering of a large amount of low rate playback segments and/or reduce buffer underrun.

12. The UE of claim 8, wherein the UE is configured to:
obtain second information comprising a second indication of an upcoming handover; and
reduce said increased lower buffer level setting to a second specified value in response to said obtained second information providing said second indication of an upcoming handover.

13. The UE of claim 12, wherein the UE is further configured to:
trigger a timer set to expire at a specified time value in response to said obtained information providing a second indication of an upcoming handover; and
reset the values of said higher buffer level setting, said lower buffer level setting to original settings of said playback buffer when said timer expires.

14. The UE of claim 13, wherein the UE is configured to reset the values of said decreased media segment size setting to the original values of said playback buffer when said timer expires.

15. The UE of claim 8, wherein the UE is adapted to obtain the first information by utilizing a receiver to obtain the first information from a network controller, wherein the first information comprises the first and second specified values.

16. A method for enabling adjustments of a playback buffer in a user equipment (UE), comprising:
obtaining first information providing a first indication of an upcoming handover of the UE;
determining values specifying an increased upper buffer level setting and an increased lower buffer level setting of said playback buffer in response to said obtained first information providing said first indication of an upcoming handover of said UE; and
transmitting said determined values to said UE to enable said UE to implement said increased upper buffer level setting and said lower buffer level setting to provide a way to obtain a larger data download prior to a handover.

17. The method of claim 16, further comprising:
appointing a decreased media segment size setting of playback buffer setting in response to said obtained first information providing said first indication of an upcoming handover of said UE; and
transmitting said appointed decreased media segment size setting to said UE to enable a reduction in the buffering of a large amount of low rate playback segments and/or a reduction of buffer underrun.

18. The method of claim 16, further comprising:
obtaining second information comprising a second indication of an upcoming handover of said UE;
establishing a second specified value corresponding to a reduction of said increased lower buffer level setting to a new lower buffer level setting when said obtained information provides said second indication of an upcoming handover of said UE; and
transmitting said established second specified value to said UE to enable said UE to implement said new lower buffer level setting.

19. The method of claim 18, further comprising:
setting a timer expiration time when said second indication of a handover of said UE is obtained; and
transmitting instructions to the UE enabling the UE to reset the values of said higher buffer level setting, said lower buffer level setting and said media segment size setting to the original values of the playback buffer when said set timer expiration time expires.

20. The method of claim 19, wherein the step of transmitting instructions comprises transmitting the value of the set timer expiration time to said UE enabling the UE to trigger a timer and reset the values of said higher buffer level setting, said lower buffer level setting and said media segment size setting to the original values of the playback buffer when said set timer expires.

21. The method of claim 19, wherein the step of setting a timer expiration time also comprises triggering said timer provided with said timer expiration time and wherein the step of transmitting instructions comprises transmitting instructions to said UE instructing the UE to reset the values of said higher buffer level setting, said lower buffer level setting and said media segment size setting to the original values of the playback buffer when timer expiration time of said triggered timer expires.

22. A computer program product comprising a non-transitory computer readable medium storing instructions for performing the method of claim 16.

23. A network controller configured to enable adjustment of a playback buffer in a user equipment (UE), wherein said network controller is configured to:
obtain first information based on measurements of at least one metric providing a first indication of an upcoming handover of a UE; and
determine values specifying an increased upper buffer level setting and an increased lower buffer level setting of playback buffer in response to said obtained first information providing said first indication of an upcoming handover of said UE; and
transmit said determined values to said UE to thereby enable said UE to implement said increased upper buffer level setting and said lower buffer level settings to provide a way to obtain a larger data throughput prior to a potential handover.

24. The network controller of claim 23, wherein the network controller comprises a processor and a memory, said memory comprising instructions executable by the processor, whereby the processor is operative to determine values specifying an increased upper buffer level setting and a lower buffer level setting of a pre-configured playback buffer if said obtained first information provides a first indication of an upcoming handover of said UE.

25. The network controller of claim 23, wherein the network controller comprises communication circuitry configured to obtain information providing a first indication of an upcoming handover of said UE and configured to transmit said determined values specifying an increased upper buffer level setting and an increased lower buffer level setting of a pre-configured playback buffer to said UE.

26. The network controller of claim 23, wherein the network controller is further configured to:
generate a decreased media segment size setting of a pre-configured playback buffer setting in response to said obtained information providing said first indication of an upcoming handover of said UE; and
transmit said generated decreased media segment size setting to said UE to thereby reduce buffering of a large amount of low rate playback segments and/or reduce buffer underrun.

27. The network controller of claim 23, wherein the network controller is further configured to:
obtain information comprising a second indication of an upcoming handover of said UE;
establish a second specified value corresponding to a reduction of said increased lower buffer level setting to a new lower buffer level setting when said obtained information provides said second indication of an upcoming handover of said UE; and
transmit said established second specified value to said UE to enable said UE to implement said new lower buffer level setting.

28. The network controller of claim 27, wherein the network controller is further configured to:
set a timer expiration time when said second indication of a handover of said UE is obtained; and
transmit said set timer expiration time to the UE to enable the UE to trigger a timer to expire at the set timer and reset the values of said higher buffer level setting, said lower buffer level setting and said media segment size setting to the values of the pre-configured playback buffer when said timer expires.

29. The network controller of claim 27, wherein the network controller is further configured to:
set a timer expiration time when said second indication of a handover of said UE is obtained; and
trigger said timer provided with said set timer expiration time; and
transmit instructions to the UE to instruct said UE to reset the values of said higher buffer level setting, said lower buffer level setting and said media segment size setting to the values of the pre-configured playback buffer when said set timer expiration time expires.

* * * * *